US008890835B2

(12) United States Patent
Nagata et al.

(10) Patent No.: US 8,890,835 B2
(45) Date of Patent: Nov. 18, 2014

(54) INPUT APPARATUS AND DISPLAY SYSTEM

(75) Inventors: Koji Nagata, Hachioji (JP); Norio Mamba, Kawasaki (JP); Tsutomu Furuhashi, Mobara (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 376 days.

(21) Appl. No.: 13/022,752

(22) Filed: Feb. 8, 2011

(65) Prior Publication Data

US 2011/0205181 A1    Aug. 25, 2011

(30) Foreign Application Priority Data

Feb. 24, 2010  (JP) ................ 2010-038155

(51) Int. Cl.
*G06F 3/044* (2006.01)
(52) U.S. Cl.
CPC ..................... *G06F 3/044* (2013.01)
USPC ...................... 345/174; 178/18.01
(58) Field of Classification Search
CPC ......... G06F 3/041; G06F 3/044; G06F 3/045; G06F 3/0416
USPC ......... 345/173–174; 178/18.01, 18.05–18.06, 178/20.01–20.04
See application file for complete search history.

(56) References Cited

U.S. PATENT DOCUMENTS

| 4,680,429 | A | * | 7/1987 | Murdock et al. ........... 178/20.02 |
| 5,451,724 | A | * | 9/1995 | Nakazawa et al. ......... 178/18.05 |
| 6,404,353 | B1 | | 6/2002 | Coni et al. |
| 6,466,036 | B1 | | 10/2002 | Philipp |
| 7,808,490 | B2 | * | 10/2010 | Chang et al. ................... 345/173 |
| 2007/0262966 | A1 | * | 11/2007 | Nishimura et al. ........... 345/173 |
| 2008/0211782 | A1 | * | 9/2008 | Geaghan et al. .............. 345/173 |

FOREIGN PATENT DOCUMENTS

| JP | 08-249106 | 9/1996 |
| JP | 2001-507148 | 5/2001 |
| JP | 2006-146895 | 6/2006 |

* cited by examiner

*Primary Examiner* — Amare Mengistu
*Assistant Examiner* — Stacy Khoo
(74) *Attorney, Agent, or Firm* — Antonelli, Terry, Stout & Kraus, LLP.

(57) ABSTRACT

An input apparatus includes: a transparent substrate with which an object is brought into contact; a rectangular single sheet electrode formed on the transparent substrate; first detection means which inputs a measurement signal to the rectangular single sheet electrode from one of two opposing perimeter portions along a first direction, and takes out the measurement signal from another one of the two opposing perimeter portions, to detect a contact point of the contacting object along the first direction; and second detection means which, after the contact point in the first direction is detected, inputs a measurement signal to the rectangular single sheet electrode from one of two opposing perimeter portions along a second direction, and takes out the measurement signal from another one of the two opposing perimeter portions, to detect the contact point along the second direction.

14 Claims, 21 Drawing Sheets

INPUT APPARATUS AND DISPLAY SYSTEM

CROSS-REFERENCE TO RELATED APPLICATION

The present application claims priority from Japanese patent application JP2010-038155 filed on Feb. 24, 2010, the content of which is hereby incorporated by reference into this application.

BACKGROUND OF THE INVENTION

1. Field of the Invention

The present invention relates to an input apparatus and a display system that includes the input apparatus. More particularly, the present invention relates to a screen input type image display system that is built by combining a capacitive touch sensor and a display device.

2. Description of the Related Art

An image display system that has a sensor function in a display screen such as a function (screen input function) of inputting information by a touching operation using a finger or a stylus pen is used for a mobile electronic device such as a PDA or a portable terminal, various home electric appliances, or a stationary customer guidance terminal such as an automatic reception machine. As a sensing method used for the image display system which has such a screen input function, there are known a method of detecting changes in resistance value of a touched portion, a method of detecting changes in capacitance thereof, a method of detecting changes in light intensity of a portion shielded by touching, and the like. Among these methods, the method of detecting changes in capacitance (capacitive method) has particularly grown in usage because of little influence on how a displayed image is seen and high durability. The capacitive method is roughly divided into a projected type in which an electrode for detecting the capacitance is broken into pieces that are arranged in a matrix pattern and a surface capacitive type in which a single-piece sheet electrode is used.

U.S. Pat. No. 6,466,036 B1 discloses an example of the projected type method of detecting changes in capacitance. In this method, electrode pieces are sequentially charged/discharged to detect the point of contact with a finger or the like from a difference in the amount of charge or discharge among the electrode pieces. JP 2006-146895 A discloses an example of the surface type method of detecting changes in capacitance. In this method, signals are input from the four corners of a single rectangular electrode to detect the point of contact with a finger or the like from a difference in the amount of output current among sources of the signals.

The projected type method described in U.S. Pat. No. 6,466,036 B1 uses an electrode broken into pieces and accordingly has an advantage in that a high point detection resolution is obtained with a sensor that is small in area such as the one for a portable terminal. A problem of this method is that the need to form a complicated electrode structure raises the manufacture cost.

The surface type method described in JP 2006-146895 A uses a simple electrode structure and accordingly has an advantage of being low in manufacture cost. A drawback of this method is that obtaining a high point detection resolution is difficult with a sensor that is small in area. The application of the surface type method to a small-area sensor such as the one for a portable terminal is therefore difficult while the surface type method is easily applied to cases where a large-sized sensor is needed as in a stationary customer terminal.

SUMMARY OF THE INVENTION

The present invention has been made in view of these problems, and an object of the present invention is therefore to provide a capacitive sensor that is applicable to a small-area sensor required in portable terminals and other similar devices as well as to a large-area sensor, and a technology of lowering the manufacture cost of a display system that uses the capacitive sensor.

(1) In order to solve the above-mentioned problems, an input apparatus of the present invention includes: a touch sensor including a transparent substrate with which an object is brought into contact, and a rectangular single sheet electrode formed on the transparent substrate from a transparent conductive film, to detect a contact point of the contacting object; first detection means which inputs a measurement signal to the rectangular single sheet electrode from one of two opposing perimeter portions along a first direction, and takes out the measurement signal propagated through the rectangular single sheet electrode from another one of the two opposing perimeter portions, to detect the contact point along the first direction; and second detection means which, after the contact point in the first direction is detected, inputs a measurement signal to the rectangular single sheet electrode from one of two opposing perimeter portions along a second direction intersecting the first direction, and takes out the measurement signal propagated through the rectangular single sheet electrode from another one of the two opposing perimeter portions, to detect the contact point along the second direction.

(2) In order to solve the above-mentioned problems, a display system of the present invention includes: a display panel including a display unit; a transparent substrate which is disposed on a display side of the display panel and with which an object comes into contact; a rectangular single sheet electrode which is formed on the transparent substrate from a transparent conductive film; first detection means which inputs a measurement signal to the rectangular single sheet electrode from one of two opposing perimeter portions along a first direction, and takes out the measurement signal propagated through the rectangular single sheet electrode from another one of the two opposing perimeter portions, to detect a contact point of the contacting object along the first direction; and second detection means which, after the contact point in the first direction is detected, inputs a measurement signal to the rectangular single sheet electrode from one of two opposing perimeter portions along a second direction intersecting the first direction, and takes out the measurement signal propagated through the rectangular single sheet electrode from another one of the two opposing perimeter portions, to detect the contact point along the second direction.

According to the present invention, a surface capacitive sensor capable of obtaining a high point detection resolution with a single-piece sheet electrode that is small in area can be applied to a small-area sensor that is required in portable terminals and other similar devices as well as to a large-area sensor, and the capacitive sensor is realized at low cost.

Other effects of the present invention become clear by reading through the description given herein.

DETAILED DESCRIPTION OF THE INVENTION

Embodiments of the present invention are described below with reference to the drawings. In the following description, the same components are denoted by the same reference symbols to avoid a repetitive description.

[First Embodiment]

Figure 1:
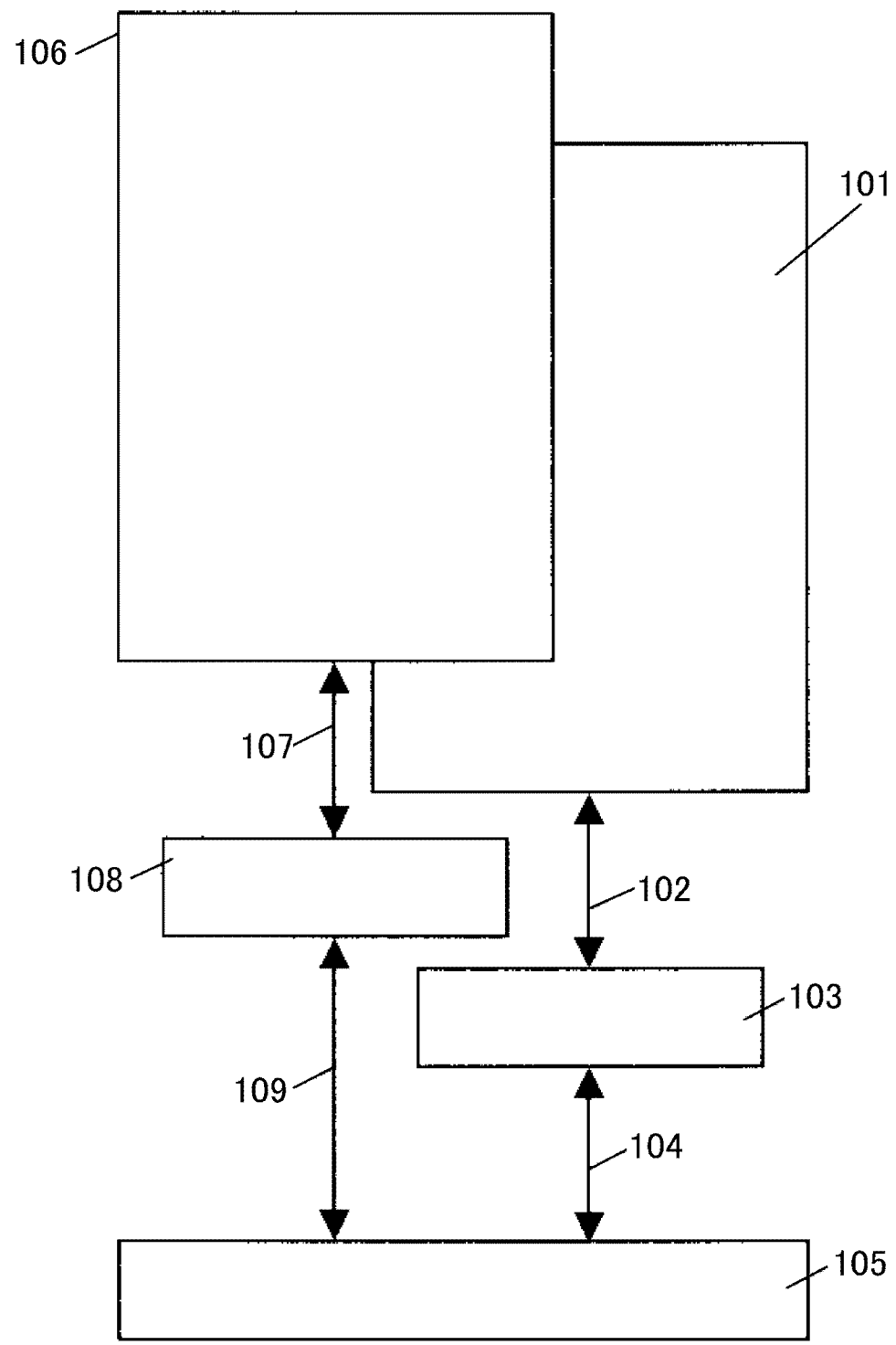
FIG. 1 is a diagram illustrating an overall structure of a display system according to a first embodiment of the present invention.

FIG. 1 is a diagram illustrating an overall structure of a display system according to a first embodiment of the present invention, specifically, a diagram illustrating the overall structure of a screen input type image display system that includes a touch sensor as a component. Other components of this display system than the touch sensor, which is denoted by 106, and a detection control circuit 108 are the same as those in any conventional screen input type image display system. The following description therefore deals mainly with details of the touch sensor 106 and the detection control circuit 108.

As illustrated in FIG. 1, the touch sensor 106 in the display system of the first embodiment is placed on the display side of a display device 101, which is a known liquid crystal display, organic EL display, or the like. A display controller 103 is connected to the display device 101 to supply data 102 relevant to the displaying of an image such as image display data and a control signal. A detection control circuit 108 is connected to the touch sensor 106 to exchange detection signals 107 and others. A system controller 105 is connected to the display controller 103 and the detection control circuit 108. The system controller 105 provides the display controller 103 with a display control signal 104 in which a processing result using coordinate data 109 obtained from the touch sensor 106 is combined with other types of information.

In short, the display system of the first embodiment is constructed such that the system controller 105 unitarily controls an image display section, which includes the display device 101 and the display controller 103, and an input apparatus section, which includes the touch sensor 106 and the detection control circuit 108.

Figure 2:
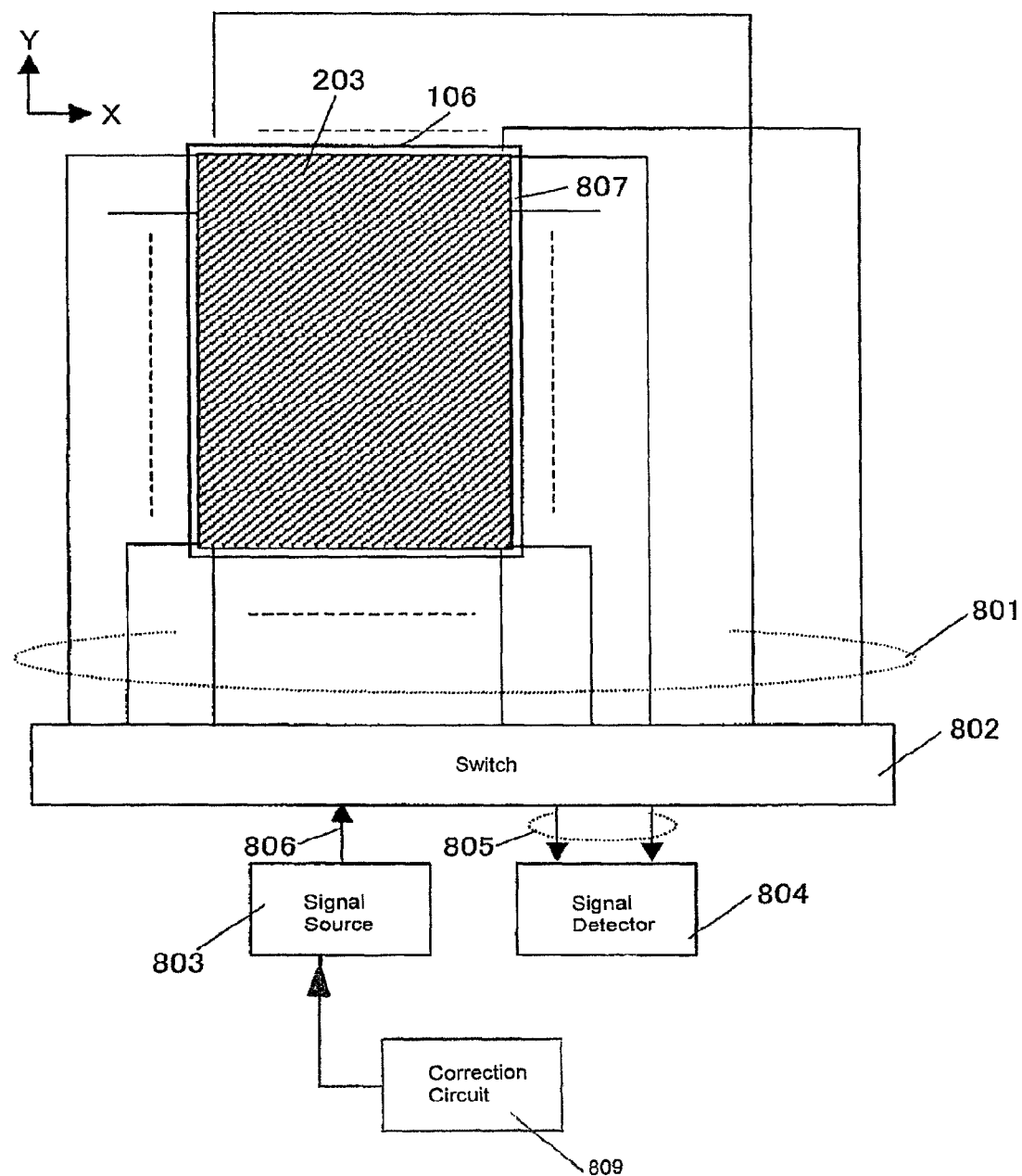
FIG. 2 is a diagram illustrating a detailed structure of a touch sensor in the display system according to the first embodiment of the present invention.

FIG. 2 is a diagram illustrating a detailed structure of the input apparatus section in the display system according to the first embodiment of the present invention. The structure of the input apparatus section of the first embodiment is described below with reference to FIG. 2. In FIG. 2 and the following description, X and Y represent an X axis and a Y axis, respectively.

As is clear from FIG. 2, the input apparatus section of the first embodiment includes the touch sensor 106 including a transparent substrate 807, which is a transparent glass substrate, resin substrate, or the like, and a single-piece sheet electrode 203, which is formed on the transparent substrate 807 and has a rectangular shape. The single-piece sheet electrode 203 has perimeter portions along its four sides. For each of the four sides of the single-piece sheet electrode 203, an alternating current signal, which serves as a measurement signal, is supplied to the relevant perimeter portion through at least one signal line path 801, and, from the opposite side of this side to which the measurement signal (alternating current signal) is supplied, a measurement signal (alternating current signal) supplied to the single-piece sheet electrode 203 is detected.

In the first embodiment, the same signal line path 801 and a switch circuit 802 are used to supply a signal 806 generated in a signal source circuit 803, and to detect a signal 805 output from the single-piece sheet electrode 203. This switch circuit 802 can make each signal line path 801 switch between functioning as a measurement signal (alternating current signal) supply line and functioning as a measurement signal (alternating current signal) detection line by, for example, connecting two known switch elements (not shown) to the same signal line path 801, connecting one of the two switch elements to the signal source circuit 803 and the other switch element to the signal detection circuit 804, and turning on one of the two switch elements with an output of the system controller 105. Constructed as this, the touch sensor 106 of the first embodiment is reduced in the number of signal line paths 801 connected to the single-piece sheet electrode 203, and has an accordingly narrow frame. Detection operation in the first embodiment involves controlling the input/output function of each of the four sides of the rectangular single-piece sheet electrode 203 by switching setting conditions of the switch circuit 802 with the use of the system controller 105, and detecting the point of contact (contact coordinates) with a finger of a not-shown operator or other contact objects. Details of the detection operation are described later.

Figure 3:
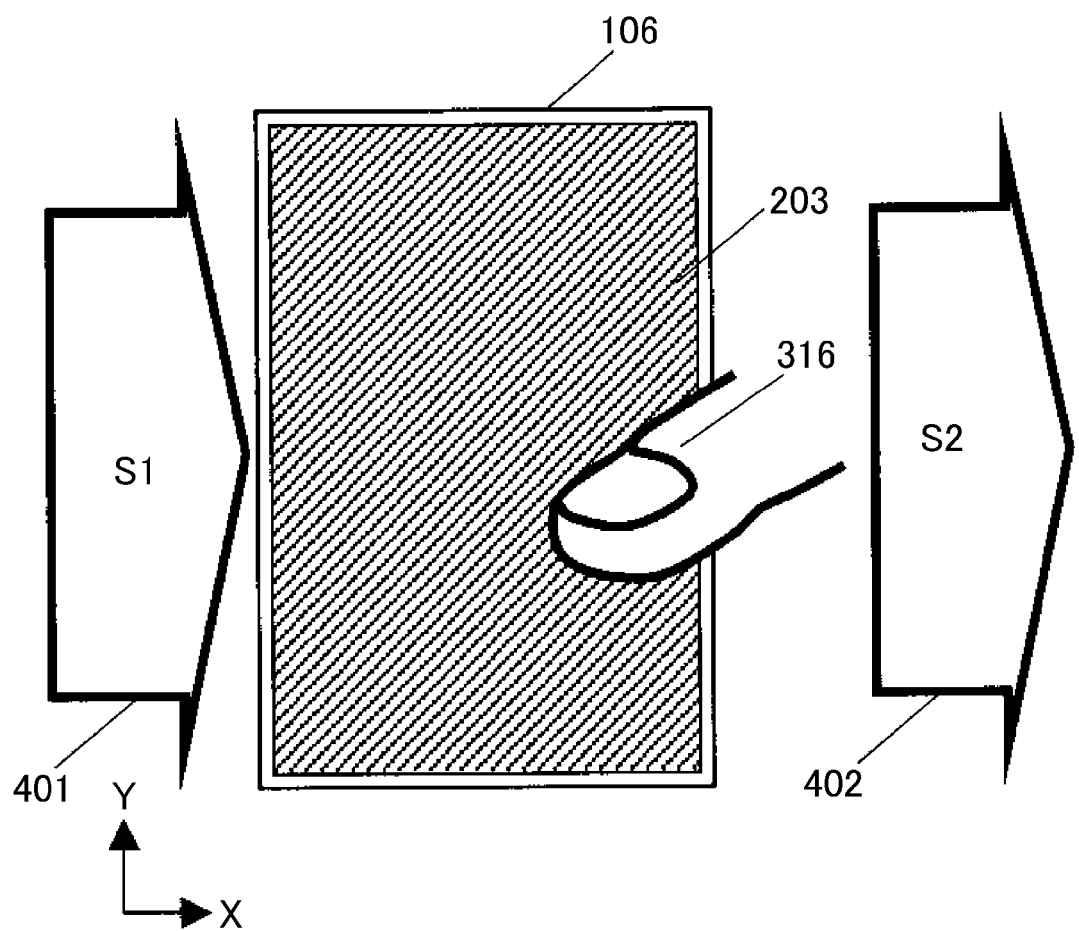
FIG. 3 is a diagram illustrating an operation principle of detecting a contact point in a Y-axis direction in the display system according to the first embodiment of the present invention.
Figure 4:
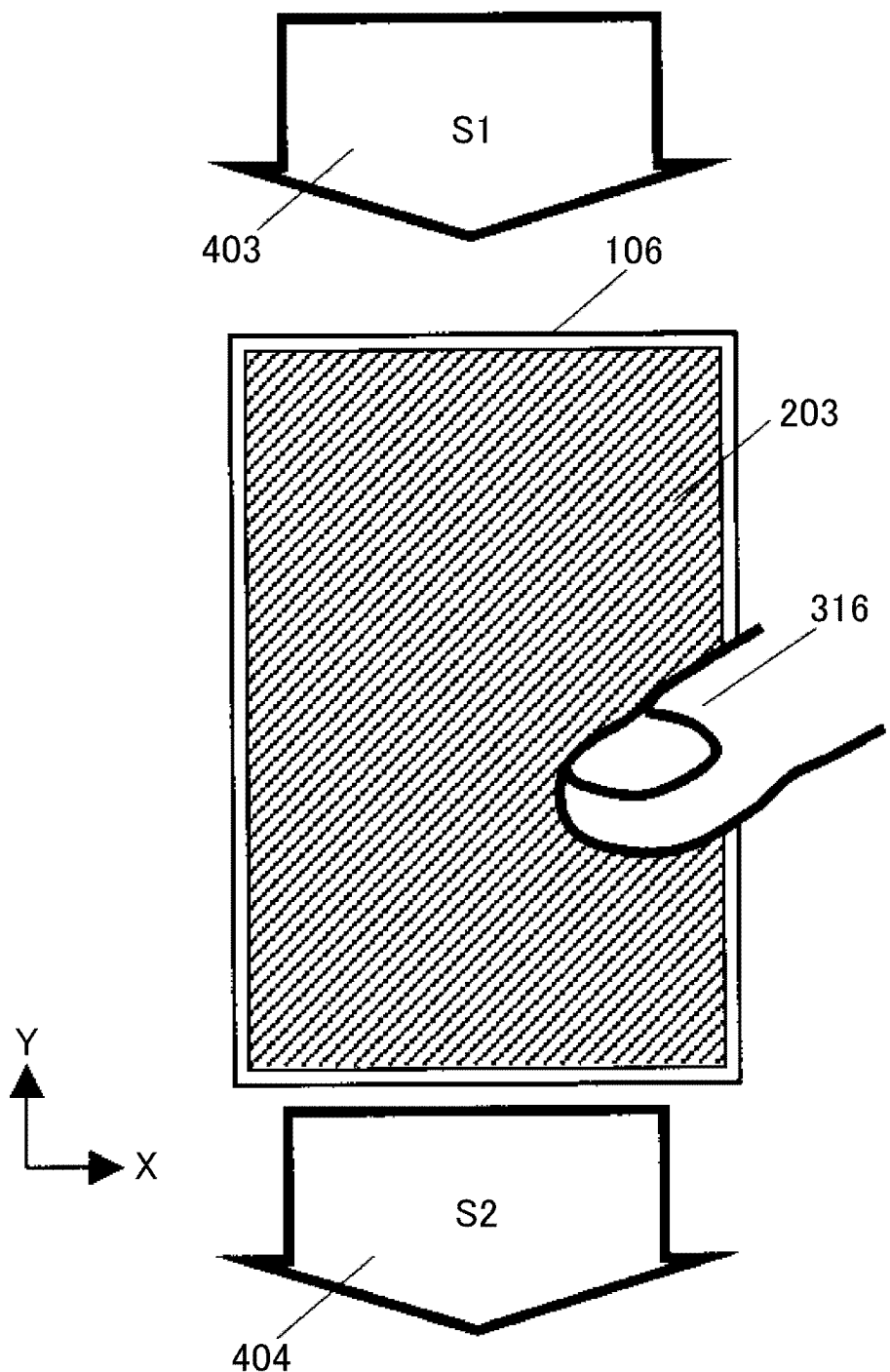
FIG. 4 is a diagram illustrating an operation principle of detecting a contact point in an X-axis direction in the display system according to the first embodiment of the present invention.

FIG. 3 is a diagram illustrating an operation principle of detecting a contact point in a Y-axis direction in the display system according to the first embodiment of the present invention. FIG. 4 is a diagram illustrating an operation principle of detecting a contact point in an X-axis direction in the display system according to the first embodiment of the present invention. The operation principle of detection is described below with reference to FIGS. 3 and 4.

As illustrated in FIG. 3, in order to detect a contact point along the direction of the longer sides of the touch sensor 106 (Y-axis direction), a measurement signal (alternating current signal) 401 is input from one of the two perimeter portions in the longer side direction, propagated through the single-piece sheet electrode 203, and detected as a measurement signal (alternating current signal) 402 at the other perimeter portion which is opposite to the side where the measurement signal (alternating current signal) 401 is input. The detection control circuit 108 in the first embodiment identifies positional information in the Y-axis direction based on a change of a measurement signal (alternating current signal) from a state S1 to a state S2 which accompanies a contact with a finger 316. The detection accuracy is therefore high in a region 601 enclosed by the dotted lines in FIG. 5, namely, a perimeter region that is close to the detection side. Details of the contact point detection operation are described later.

Similarly, as illustrated in FIG. 4, in order to detect a contact point along the direction of the shorter sides of the touch sensor 106 (X-axis direction), an alternating current signal 403 is input from one of the two perimeter portions in the shorter side direction, and detected as an alternating current signal 404 at the other perimeter portion which is opposite to the side where the alternating current signal is input. Also in this case, the detection control circuit 108 in the first embodiment identifies positional information in the X-axis direction based on a change of an alternating current signal from a state 51 to a state S2 which accompanies a contact with the finger 316. The detection accuracy is therefore high in a region 602 enclosed by the dotted lines in FIG. 6, namely, a perimeter region that is close to the detection side.

Figure 5:
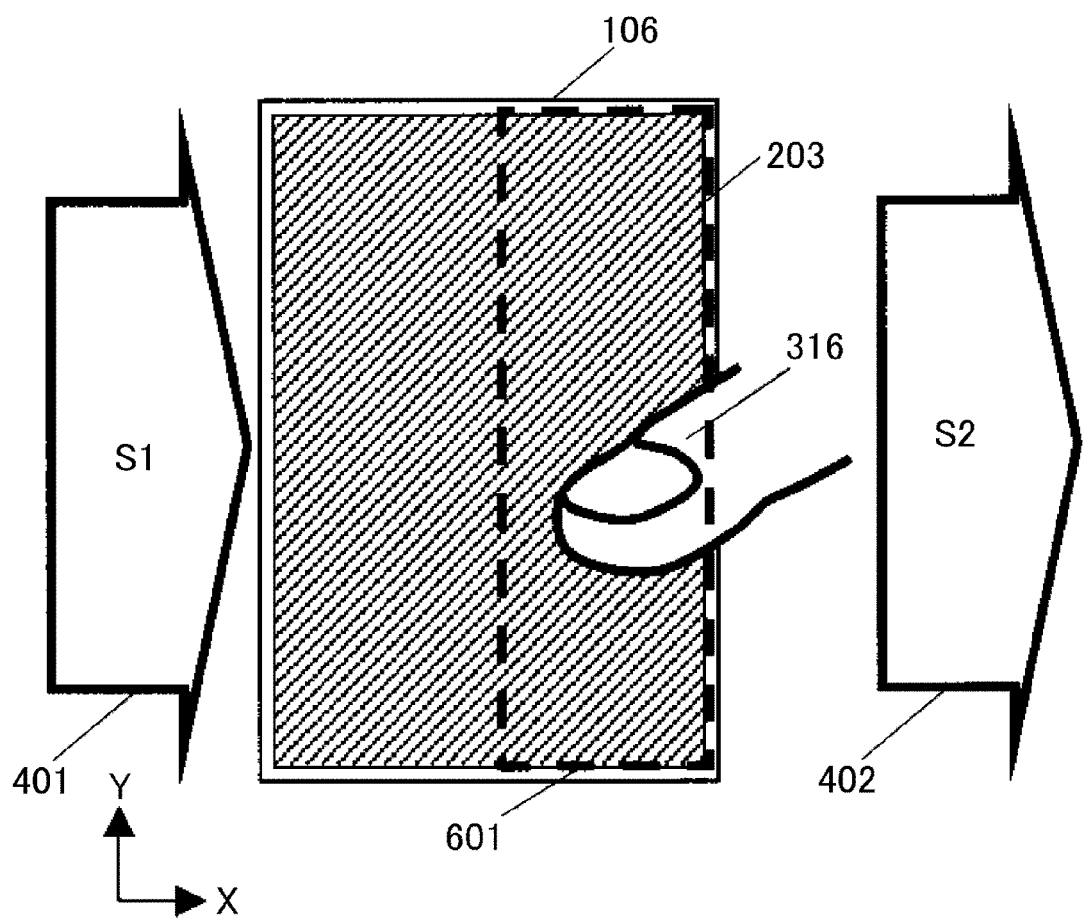
FIG. 5 is a diagram illustrating a region in which the detection accuracy is high during the operation of FIG. 3.
Figure 6:
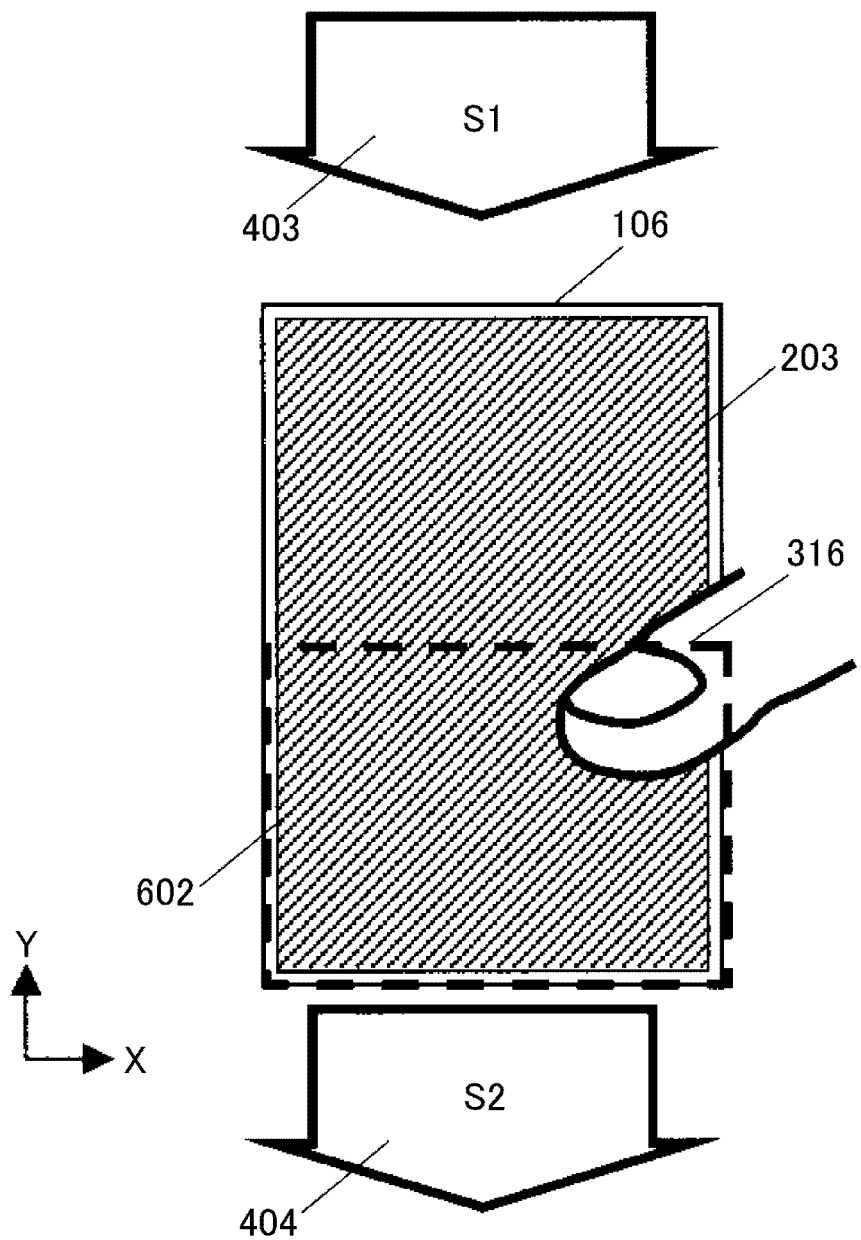
FIG. 6 is a diagram illustrating a region in which the detection accuracy is high during the operation of FIG. 4.
Figure 7:
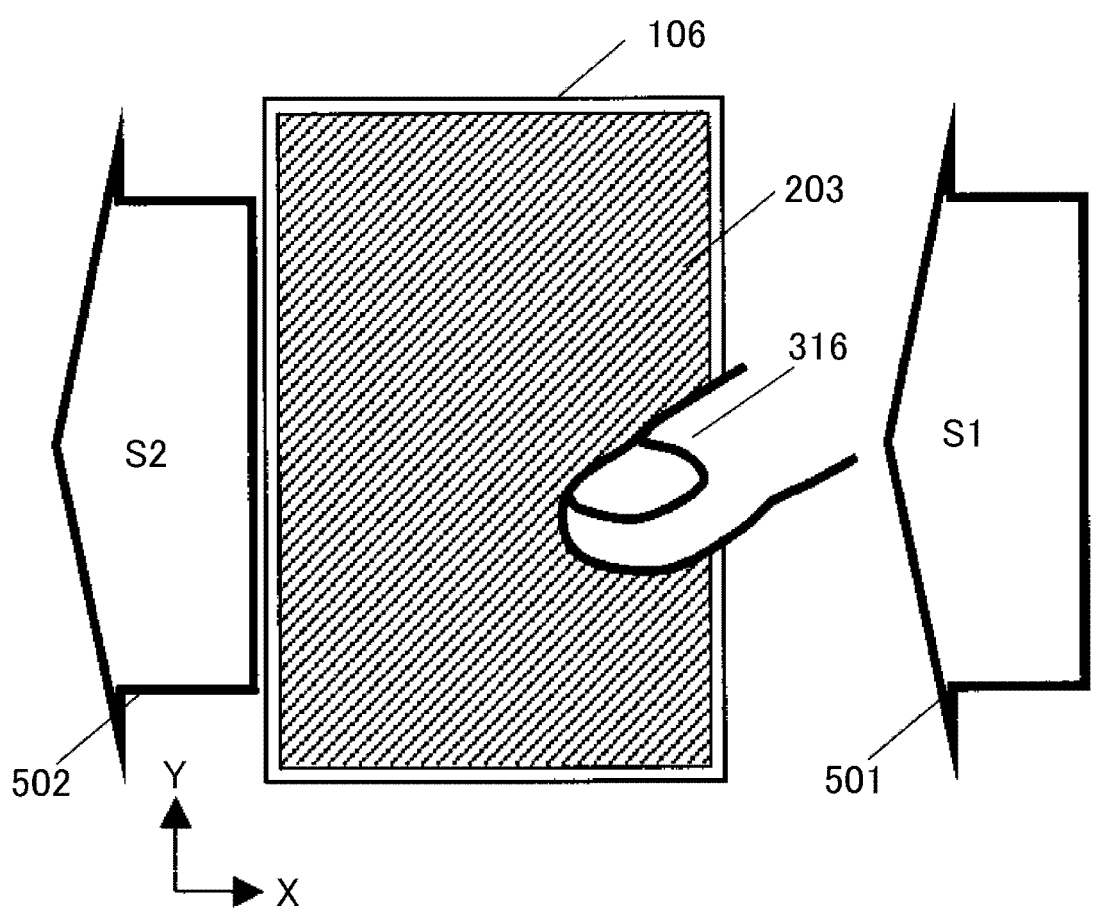
FIG. 7 is a diagram illustrating an operation principle of detecting a contact point in the Y-axis direction in the display system according to the first embodiment of the present invention.
Figure 8:
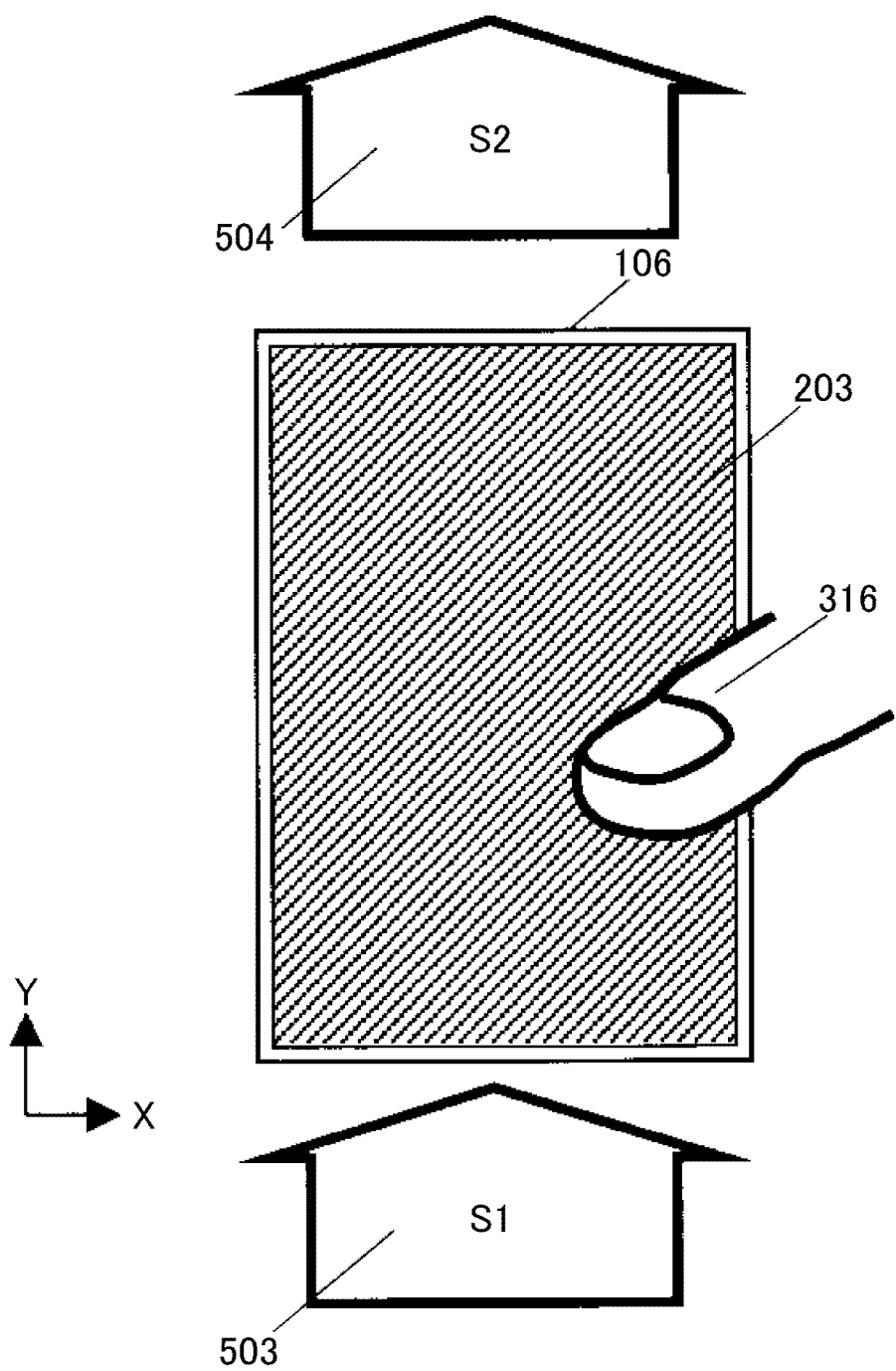
FIG. 8 is a diagram illustrating an operation principle of detecting a contact point in the X-axis direction in the display system according to the first embodiment of the present invention.
Figure 9:
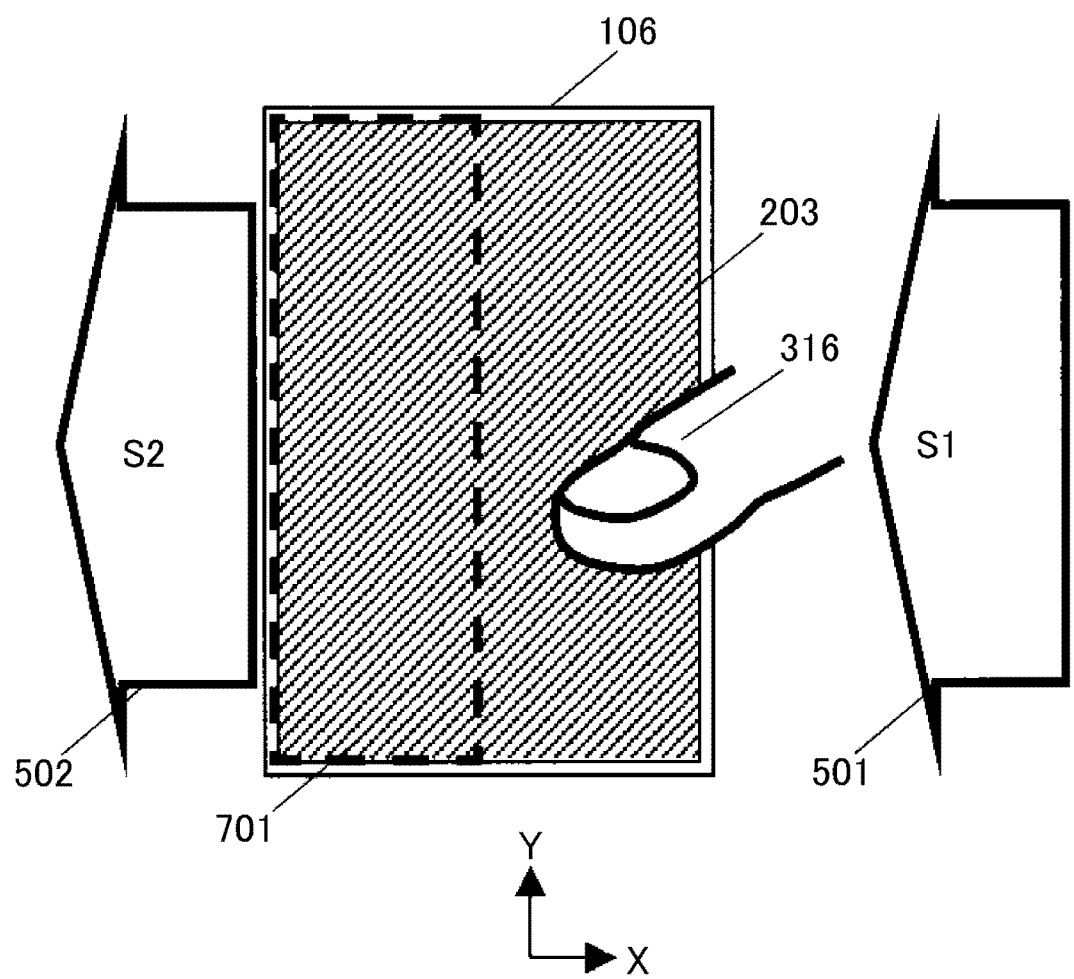
FIG. 9 is a diagram illustrating a region in which the detection accuracy is high during the operation of FIG. 7.
Figure 10:
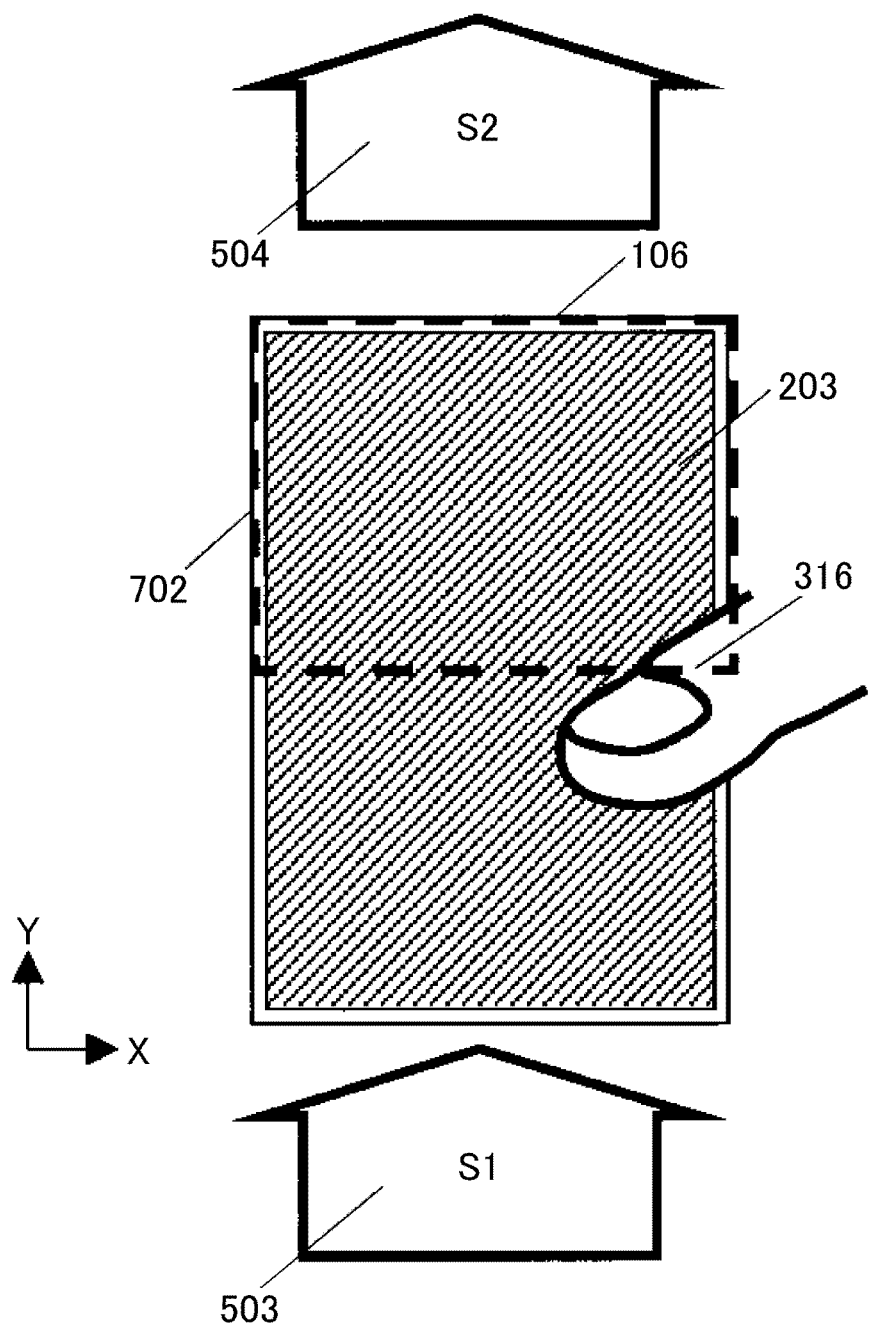
FIG. 10 is a diagram illustrating a region in which the detection accuracy is high during the operation of FIG. 8.

However, as is clear from FIGS. 5 and 6, the detection accuracy in other regions than the regions 601 and 602 enclosed by the dotted lines is lower than in the regions 601 and 602. The first embodiment solves this by switching perimeter portions that are input alternating current signals 501 and 503 with perimeter portions where detection is made as illustrated in FIGS. 7 and 8, thus switching the regions 601 and 602 with regions 701 and 702 which are high in accuracy as illustrated in FIGS. 9 and 10. The switching between the side where the alternating current signals 501 and 503 are input and the side where alternating current signals 502 and 504 are detected is accomplished by switching by way of the switch circuit 802.

Figure 11:
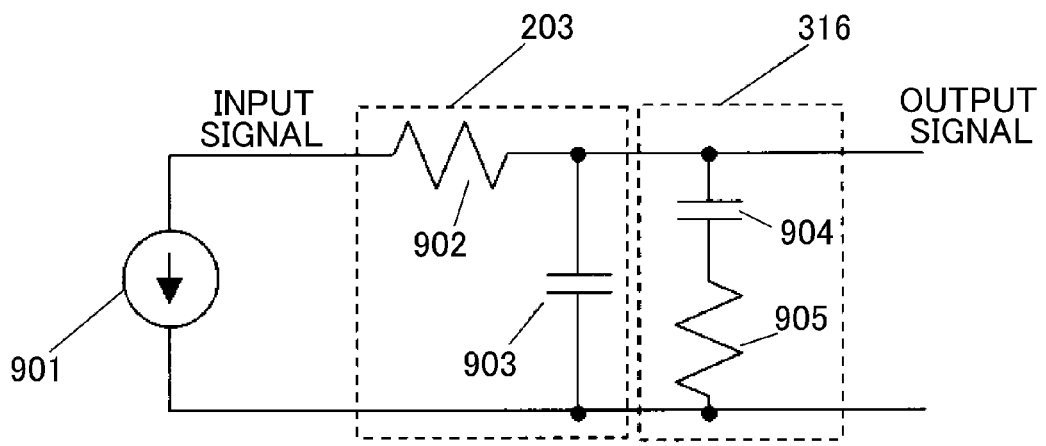
FIG. 11 is an equivalent circuit diagram concerning signal input/output that is executed when a finger comes into contact with the touch sensor according to the first embodiment of the present invention.
Figure 12:
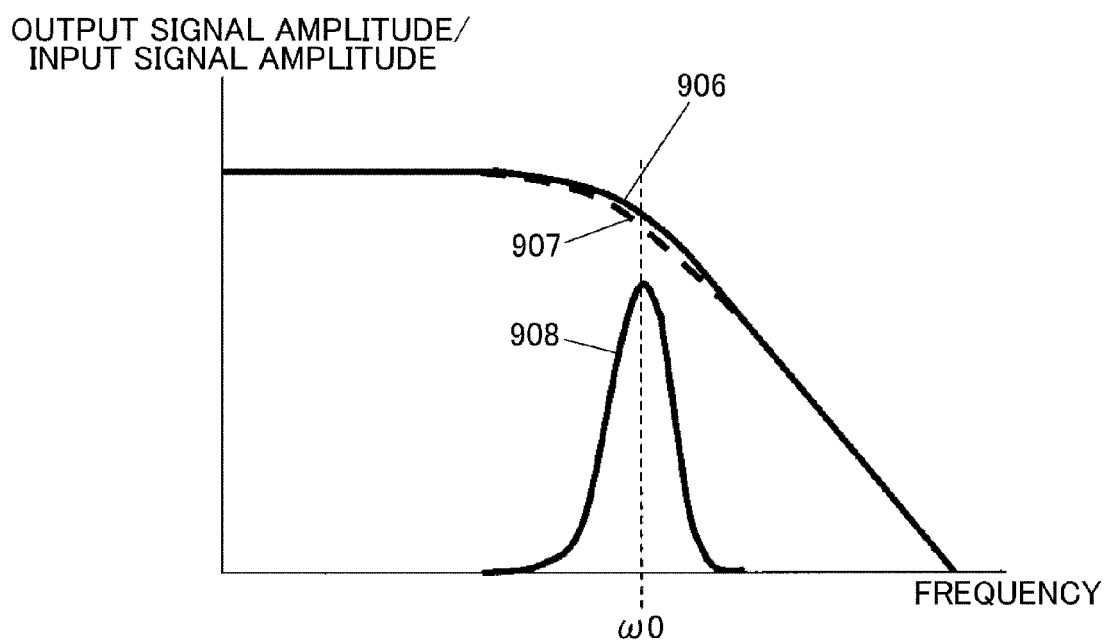
FIG. 12 is a graph illustrating the frequency characteristics of signals that are input/output when a finger comes into contact with the touch sensor according to the first embodiment of the present invention.

FIG. 11 is an equivalent circuit diagram concerning signal input/output that is executed when a finger comes into contact with the touch sensor according to the first embodiment of the present invention. FIG. 12 is a graph illustrating the frequency characteristics of signals that are input/output when a finger comes into contact with the touch sensor according to the first embodiment of the present invention. The principle of contact point detection in the touch sensor of the first embodiment is described with reference to FIGS. 11 and 12. The frequency characteristics of input/output signals that are illustrated in FIG. 12 are those observed when, as in FIG. 3, the operator brings the finger 316 into contact with the side where an alternating current signal from the single-piece sheet electrode 203 is detected. In FIG. 12, the axis of abscissa represents the frequency, the axis of ordinate represents the amplitude ratio of an input signal and an output signal, the solid line represents frequency characteristics 906, which are observed when the finger 316 is not in contact with the touch sensor 106, and the dotted line represents frequency characteristics 907, which are observed when the finger 316 is in contact with the touch sensor 106.

As described above, the touch sensor 106 of the first embodiment uses the single-piece sheet electrode 203 that is formed on a transparent substrate from a known transparent electrode material such as ITO. The single-piece sheet electrode 203 is therefore represented by a resistor 902 and a capacitor 903. An equivalent circuit including a signal source 901 of the signal source circuit 803 accordingly has a structure in which the resistor 902 and the capacitor 903 are connected in series to the signal source 901. A detection output (output signal) corresponds to a signal at both ends of the capacitor 903 because the touch sensor 106 of the first embodiment detects the alternating current signal 402, which has been propagated through the single-piece sheet electrode 203, at the perimeter portion opposite to the perimeter portion where the alternating current signal 401 has been input.

The finger 316 which comes into contact with the touch sensor 106 is also represented by a resistor 905 and a capacitor 904 which are connected in series. In the equivalent circuit, the capacitor 903 of the single-piece sheet electrode 203 is therefore connected in parallel to the resistor 905 and the capacitor 904, which are connected in series, as illustrated in FIG. 11.

With this equivalent circuit including the resistors 902 and 905 and the capacitors 903 and 904, a difference in signal characteristics in a detection system formed of the touch sensor 106 of the first embodiment comes down to a difference in filter characteristics. This means that the frequency characteristics of the detection signal 402 associated with the input signal 401 are reflected on the presence or absence of the attenuation of a specific frequency $\omega 0$ upon contact or no contact with the finger 316. Differential frequency characteristics 908, which are a difference between the frequency characteristics (the current transmission characteristics of the single-piece sheet electrode 203) 906 observed when the finger 316 is not in contact with the touch sensor 106 and the frequency characteristics (the current transmission characteristics of the single-piece sheet electrode 203) 907 observed when the finger 316 is in contact with the touch sensor 106, therefore peak at the specific frequency $\omega 0$. It is concluded from this result that the signal source 901 desirably outputs a signal containing the frequency $\omega 0$, for example, the sine wave of the frequency $\omega 0$. The frequency $\omega 0$ is set to suit individual cases because the resistance of the resistor 902 and the capacitance of the capacitor 903 vary greatly depending on the size, material, and other attributes of the single-piece sheet electrode 203. Alternatively, the output value of the differential frequency characteristics 908 may be monitored and a correction circuit 809 may be provided to correct an alternating current signal so as to contain the frequency $\omega 0$ at which the peak value of the differential frequency characteristics 908 is at maximum.

Figure 13:
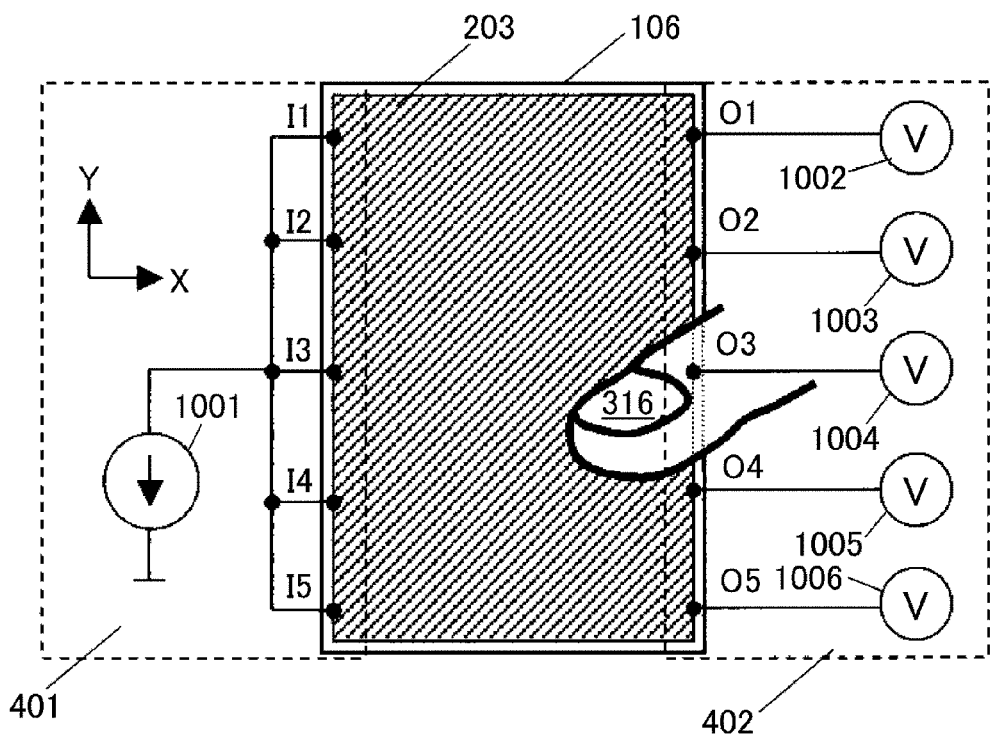
FIG. 13 is a diagram illustrating connection points of signal sources and a detection circuit when five supply points and five detection points are provided along the longer sides of the touch sensor according to the first embodiment of the present invention.
Figure 14:
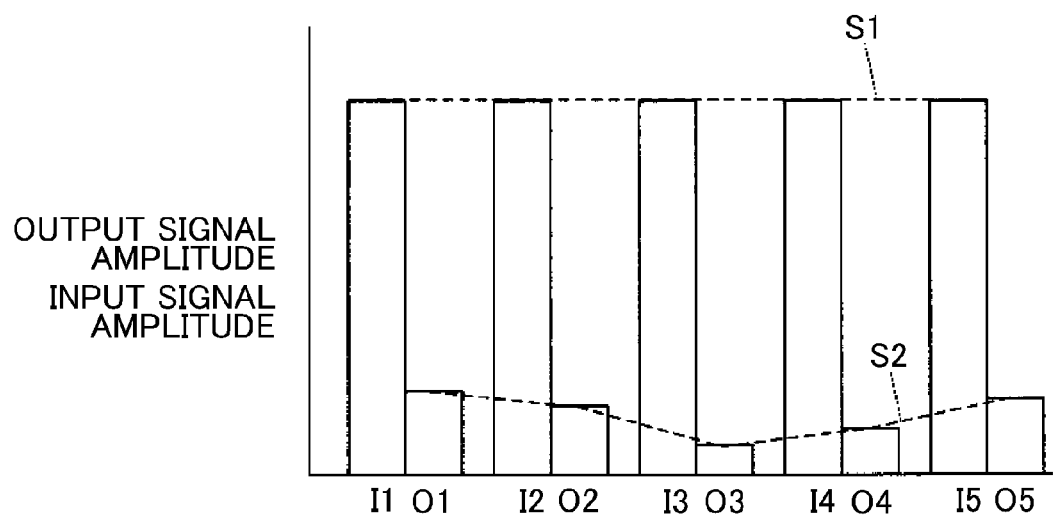
FIG. 14 is a graph comparing the state of an input signal and the state of an output signal in the touch sensor of FIG. 13.
Figure 15:
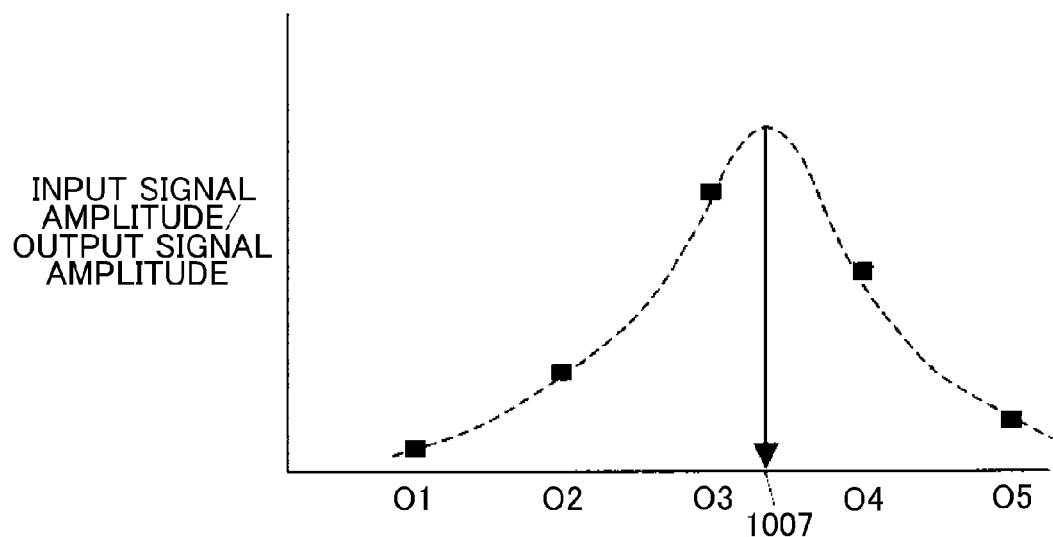
FIG. 15 is a graph illustrating the frequency characteristics of input/output signals of the touch sensor of FIG. 13.

FIG. 13 is a diagram illustrating connection points of signal sources and a detection circuit when five supply points and five detection points are provided along the longer sides of the touch sensor according to the first embodiment of the present invention. FIG. 14 is a graph comparing the state of an input signal and the state of a detection signal in the touch sensor of FIG. 13. FIG. 15 is a graph illustrating the frequency characteristics of input/output signals of the touch sensor of FIG. 13. The principle of calculating a contact point in the touch sensor of the first embodiment is described below with reference to FIGS. 13 to 15.

In the example of FIG. 13, of the left and right sides of the touch sensor 106, five alternating current signal supply points I1 to I5 are provided on one side (left-hand side in FIG. 13) and five detection points O1 to O5 are provided on the other side (right-hand side in FIG. 13) opposite to the one side. The alternating current signal supply points I1 to I5 and the detection points O1 to O5 are symmetrical in the touch sensor 106. The same alternating current signal, for example, an alternating current signal output from one signal source 1001, is distributed to be supplied to the supply points I1 to I5. Voltmeters 1002 to 1006 which are measurement units independent of one another are connected to the five detection points O1 to O5 to respectively measure the voltage at the detection points O1 to O5.

When the finger 316 is in contact with the touch sensor 106 on a side that is closer to the detection points O1 to O5 than the center of the touch sensor 106, a signal output from the signal source 1001 is divided into five and the five input signals are respectively input at the supply points I1 to I5. The alternating current signals input at the supply points I1 to I5 are distributed from one signal source 1001 and have the same amplitude. In the touch sensor of the first embodiment, a state S1 indicates the distribution of signal amplitude at the input points I1 to I5, and the state S1 of the input signals has flat characteristics as illustrated in FIG. 14.

The state S2 indicates the distribution of signal amplitude at the detection points O1 to O5 and, as illustrated in FIG. 14, attenuation peaks at the detection points O3 and O4. This is because a contact with the finger 316 which changes the frequency characteristics in the manner described above attenuates the specific frequency $\omega 0$ component contained in the alternating current signal.

The touch sensor 106 of the first embodiment therefore calculates the ratio of the state S1 and the state S2 between the opposing input points and detection points as illustrated in FIG. 15. The calculated distribution is processed by fitting, centroid calculation, or other known methods as indicated by the dotted line in FIG. 15, to thereby calculate a contact point 1007 of the finger 316.

Figure 16:
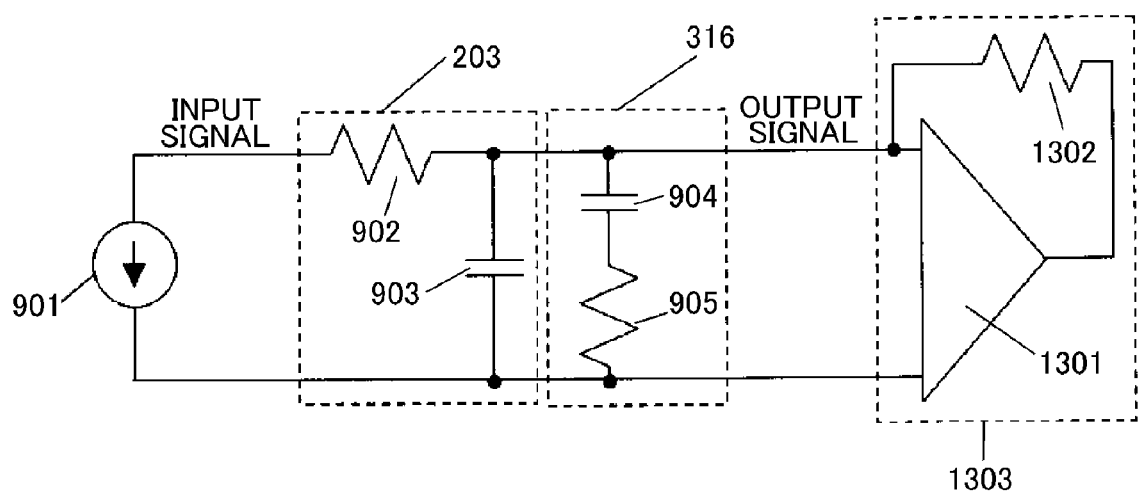
FIG. 16 is a diagram illustrating an example of an input unit of a signal detection circuit in the touch sensor according to the first embodiment.
Figure 17:
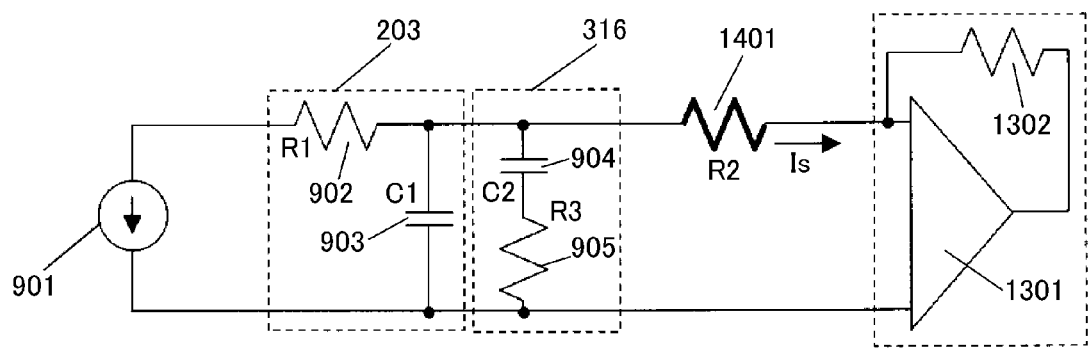
FIG. 17 is an equivalent circuit diagram of the input unit of the signal detection circuit illustrated in FIG. 16.
Figure 18:
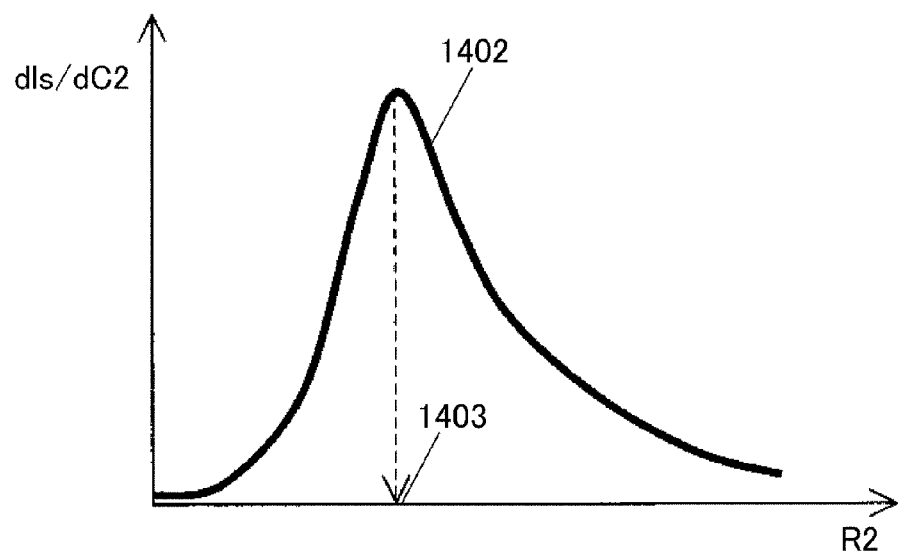
FIG. 18 is a graph illustrating a change in characteristics in the equivalent circuit of FIG. 17.

FIG. 16 is a diagram illustrating an example of an input unit (input stage) of the signal detection circuit in the touch sensor according to the first embodiment. FIG. 17 is an equivalent circuit diagram of the input unit of the signal detection circuit illustrated in FIG. 16. FIG. 18 is a graph illustrating a change in characteristics in the equivalent circuit of FIG. 17. Detection operation in the signal detection circuit of the first embodiment is described below with reference to FIGS. 16 to 18. In FIG. 18, the axis of ordinate represents the sensitivity of a detection current Is to a capacitance C2 (904), which indicates the state of contact of the finger 316 with the single-piece sheet electrode 203, and the axis of abscissa represents a resistance component R2, which is due to a transmission line (wiring), a contact point, or the like.

As illustrated in FIG. 16, the signal detection circuit of the first embodiment has an input unit in which an input circuit 1303 using an operational amplifier 1301 is disposed. The input circuit 1303 is provided specifically for each of the detection points O1 to O5, and signals input from the detection points O1 to O5 are each amplified by its associated input circuit 1303. The amplified signal is input to a not-shown voltmeter. The voltmeter measures the voltage of the detection points O1 to O5.

In the input circuit 1303 of the first embodiment, the input of the operational amplifier 1301 receives a signal from its associated detection point, and receives an output of the operational amplifier 1301 via a resistor 1302. That is called a negative feedback structure. With this structure, the negative feedback action of the operational amplifier 1301 is used to fix the electric potential of the detection point and thereby suppress a change in electric potential at the detection point.

Some resistance components are generated between the detection points O1 to O5 on the single-piece sheet electrode 203 and the operational amplifier 1301 as understood from FIG. 2 described above. One of the resistance components is due to wiring that connects the detection points O1 to O5 to the switch circuit 802 and wiring that connects the switch circuit 802 to the signal detection circuit 804. Another is a resistance component of each switch element itself that constitutes the switch circuit 802. Still another is a resistance component at a contact point in each connection portion (connection resistance). When the sum of these resistance components is the resistance component R2 (1401), currents from the detection points O1 to O5 are input to their respective input circuits 1303 via the resistance component R2 (1401) as illustrated in FIG. 17. This impairs the function of suppressing a change in electric potential at the detection points, and can possibly lower the detection sensitivity.

The detection current Is is changed by a resistance R1 (902), a capacitance C1 (903), the capacitance C2 (904), a resistance R3 (905) and the resistance component R2. The resistance R1 (902) and the capacitance C1 (903) are elements representing the single-piece sheet electrode 203 in a model. The capacitance C2 (904) and the resistance R3 (905) are elements representing the finger 316 in a model. The resistance component R2 is due to a transmission line, a contact point, and the like. As illustrated in FIG. 18, the sensitivity of the detection current Is to the capacitance C2 (904), which indicates the state of contact of the finger 316 with the single-piece sheet electrode 203, depends on the resistance component R2 (1401) to change as indicated by a curve 1402 and reaches a local maximum at a given value 1403 of the resistance component R2 (1401). Each input circuit 1303 of the first embodiment makes use of the characteristics described above. In the case where a resistance component is generated, the lowering of detection sensitivity is prevented by adjusting the resistance component R2 in the equivalent circuit in accordance with the generated resistance component. Although the touch sensor of the first embodiment is provided with an input circuit that uses the operational amplifier 1303 as the input of the signal detection circuit, the present invention is not limited thereto and other structures can be used as the input of the signal detection circuit.

The display system of the first embodiment thus includes, as an input apparatus, the touch sensor in which the single-piece sheet electrode is formed on the transparent substrate from a transparent conductive film. In the touch sensor, the detection control circuit controls the signal source circuit, the signal detection circuit, and the switch circuit in a manner that makes these circuits operate as first detection means. The first detection means inputs an alternating current signal to the single-piece sheet electrode from one of two perimeter portions stretching along the sides of the single-piece sheet electrode 203 in a Y-axis direction, which is a first direction. From the other perimeter portion which is opposite to the one perimeter portion, the first detection means takes out the alternating current signal which has been propagated through the single-piece sheet electrode, and detects a contact point along the first direction. The detection control circuit then controls the signal source circuit, the signal detection circuit, and the switch circuit in a manner that makes these circuits operate as second detection means. The second detection means inputs an alternating current signal to the single-piece sheet electrode from one of two perimeter portions stretching along the sides of the single-piece sheet electrode 203 in an X-axis direction, which is a second direction intersecting the first direction. From the other perimeter portion which is opposite to the one perimeter portion, the second detection means takes out the alternating current signal which has been propagated through the single-piece sheet electrode, and detects a contact point along the second direction. The touch sensor thus detects a contact point on a touch panel. The touch sensor constructed as this accomplishes a high point detection resolution with a single-piece sheet electrode that is small in area. As a result, a surface capacitive sensor is now applicable to a small-area sensor required in portable terminals and other similar devices as well as to a large-area sensor, and can be manufactured at low cost.

[Description of Effects of First Embodiment]

As has been described, the touch sensor of the first embodiment uses the state S2 of output signals detected at the detection points O1 to O5 to detect the position of the finger 316 along a direction in which the longer sides of the single-piece sheet electrode 203 stretches and which is the alignment direction of the detection points O1 to O5. Therefore, when detection is made by, for example, applying an input signal that increases the voltage, the electric potential distribution in the single-piece sheet electrode 203 is changed and a current flowing from the input side to the detection side is generated. The current is detected and measured at the detection points. When the finger 316 or the like is in contact with the touch sensor, on the other hand, the current transmission characteristics of the single-piece sheet electrode 203 are changed to change the current distribution in the single-piece sheet electrode 203. For detection at a high resolution, it is necessary to cause the current distribution change in a local point that corresponds to the contact point of the finger 316 or the like and to transmit a current to the detection points while maintaining the distribution.

Figure 19:
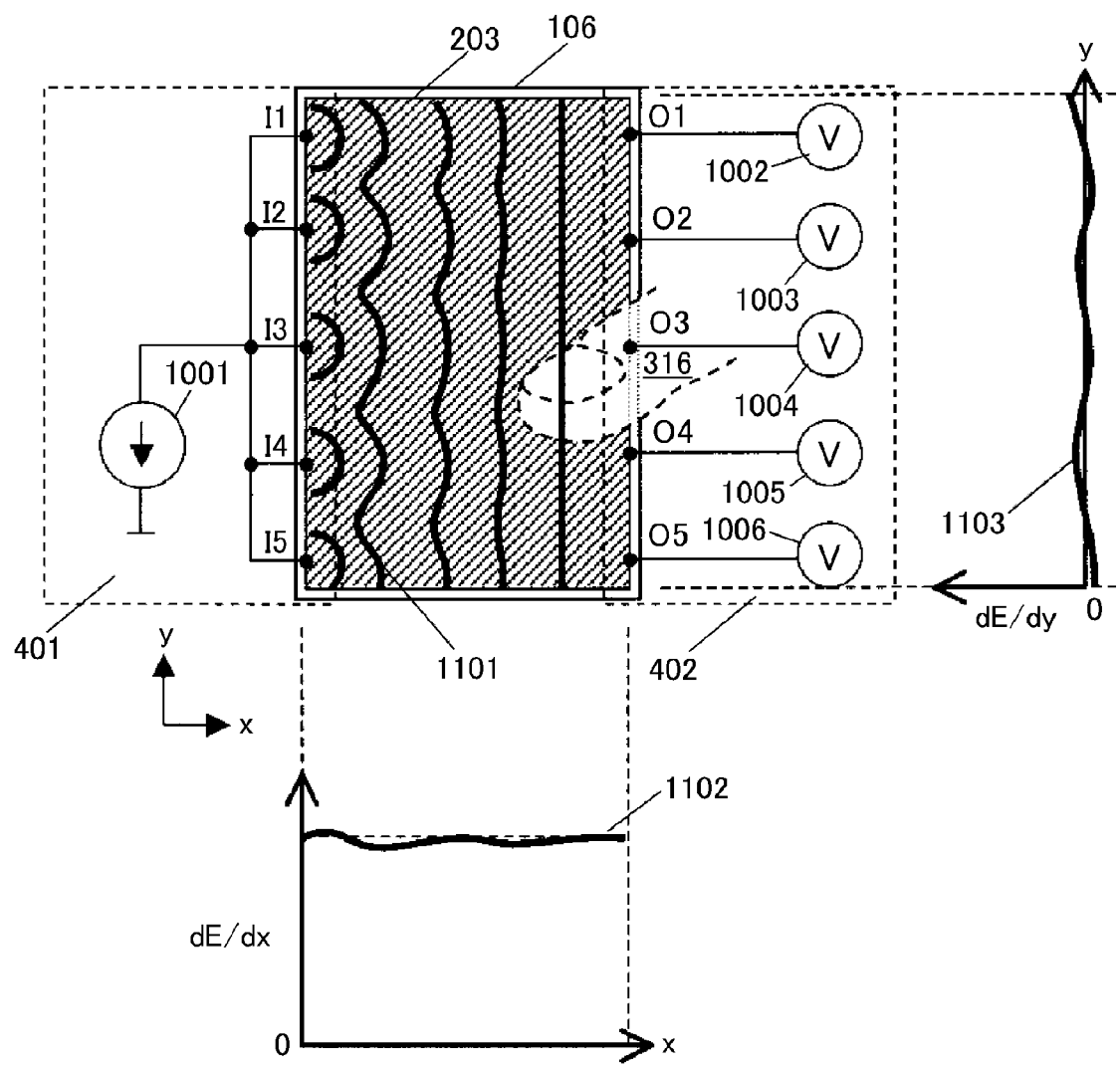
FIG. 19 is a diagram illustrating an electric potential distribution in a single-piece sheet electrode according to the first embodiment.
Figure 20:
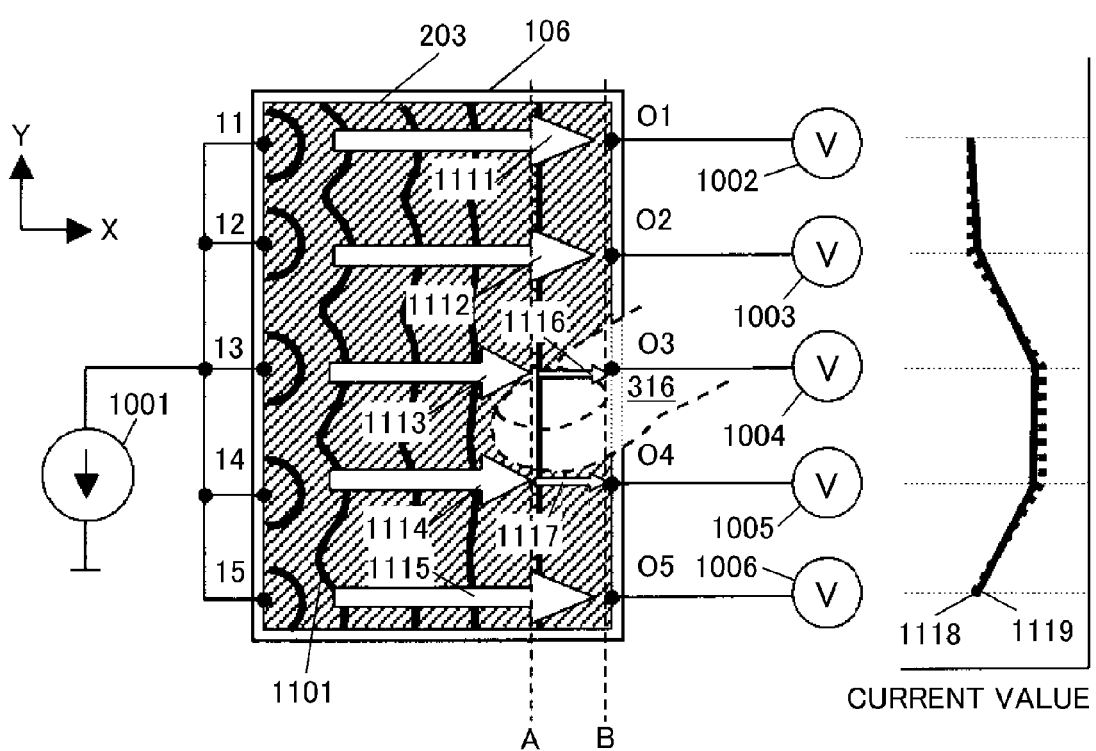
FIG. 20 is a diagram illustrating a current distribution in the single-piece sheet electrode according to the first embodiment.

FIG. 19 is a diagram illustrating an electric potential distribution in the single-piece sheet electrode according to the first embodiment. FIG. 20 is a diagram illustrating a current distribution in the single-piece sheet electrode according to the first embodiment. The accuracy of detecting a contact point in the touch sensor of the first embodiment is described below with reference to FIGS. 19 and 20. Note that, in FIGS. 19 and 20, isoelectric lines within the single-piece sheet electrode, electric field intensity graphs, and signal currents are based on simulation. The touch sensor illustrated FIGS. 19 and 20 is an example of the structure in which a signal generated by the signal source 1001 is input to the supply points I1 to I5 in a distributed manner as described above.

As illustrated in FIG. 19, an alternating current signal generated by the signal source 1001 is divided to be distributed, and the distributed alternating current signals are input from the five input points I1 to I5, which are provided along the left longer side of the single-piece sheet electrode 203 in the drawing. In the case where the input signals applied to the supply points I1 to I5 are signals that increase the voltage, for example, the electric potential distribution in the single-piece sheet electrode 203 is changed, creating an electric potential distribution that is indicated by isoelectric lines 1101. Keeping the electric potential change small on the side of the detection points O1 to O5 in this case gives the electric field intensity in a direction from the input points I1 to I5 to the detection points O1 to O5, namely, an x-axis direction, flat and large values as indicated by an electric field intensity graph (electric field intensity characteristics) 1102. Conversely, allowing a large electric potential change on the side of the detection points O1 to O5 gives the electric field intensity graph 1102 flat and small values in the direction from the input points I1 to I5 to the detection points O1 to O5, namely, the x-axis direction. Larger values in the distribution of the electric filed intensity graph 1102 mean a larger signal current flow, and therefore are preferred in improving the detection resolution.

On the other hand, the electric filed intensity in a direction parallel to the longer sides of the single-piece sheet electrode 203 along which the input points I1 to I5 and the detection points O1 to O5 are aligned, namely, a y-axis direction, is distributed closer to 0 (zero) as the distance to the detection points O1 to O5 closes as indicated by an electric field intensity graph (electric field intensity characteristics) 1103. This is because the plurality of input points I1 to I5 and the plurality of detection points O1 to O5 are provided instead of a single input point and a single detection point, and because the electric potential of the pair of shorter sides of the single-piece sheet electrode 203 where input and detection are not performed is not fixed.

It is concluded from these facts that conditions necessary to improve the detection performance are providing two or more input points and two or more detection points, preventing a change in electric potential at the detection points, and not fixing the electric potential of two opposing sides out of the four sides of the single-piece sheet electrode 203 where input and detection are not performed.

When these conditions are met, the electric potential distribution in the single-piece sheet electrode 203 is changed as illustrated in FIG. 20 to create an electric potential distribution indicated by the isoelectric lines 1101. A signal current 1111 from the input point I1 to the detection point O1, a signal current 1112 from the input point I2 to the detection point O2, a signal current 1113 from the input point I3 to the detection point O3, a signal current 1114 from the input point I4 to the detection point O4, and a signal current 1115 from the input point I5 to the detection point O5 flow from the input point I1 to I5 to the detection points O1 to O5, respectively, following the created electric potential distribution. Because the electric field intensity is in the state described above, the signal currents 1111, 1112, 1113, 1114, and 1115 flow in parallel to the shorter sides where input and detection are not performed, and have equal values. The finger 316 or the like is in contact with the touch sensor 106 along the dotted line A, which turns the signal currents 1113 and 1114 into signal currents 1116 and 1117 by attenuation, and changes the current distribution. Thereafter, the signal currents 1111, 1112, 1116, 1117, 1115 keep flowing toward the detection points and, because of the state of the electric field intensity described above, the distribution of the signal currents is maintained as indicated by a current distribution graph 1118 along the dotted line A and a current distribution graph 1119 along the dotted line B. The touch sensor of the first embodiment that fulfills the necessary conditions listed above is therefore capable of obtaining accurate contact point information.

Figure 25:
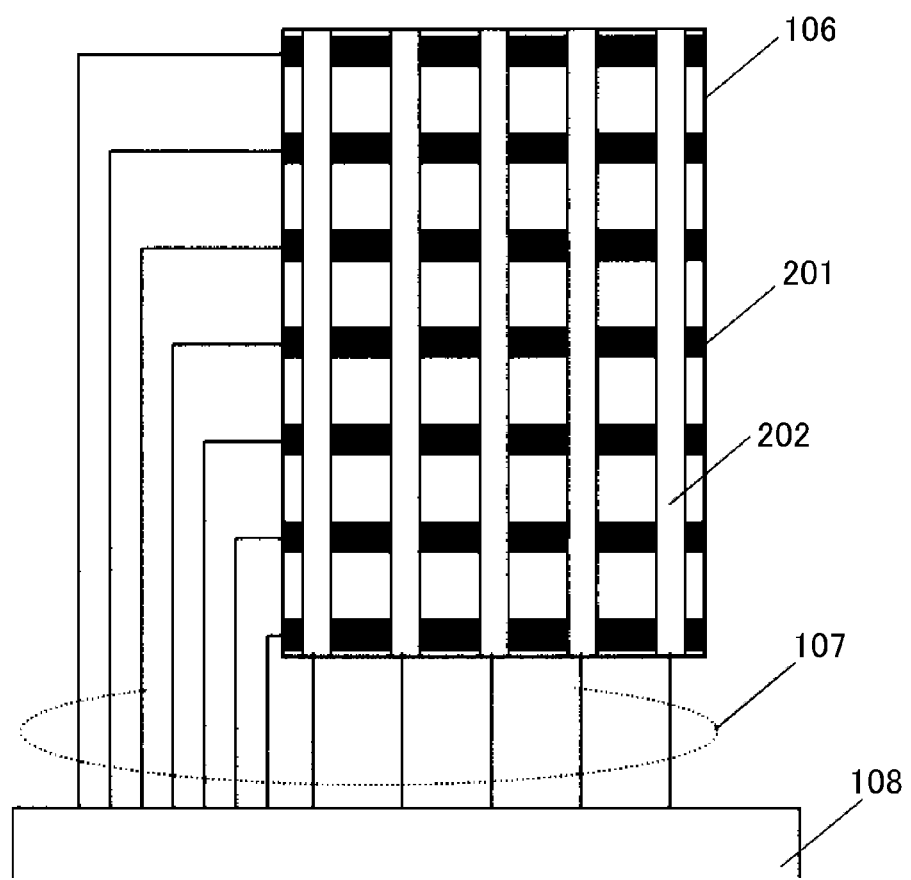
FIG. 25 is a diagram illustrating a schematic structure of a conventional projected touch sensor.

In contrast, a conventional projected touch sensor illustrated in FIG. 25 has a plurality of X electrodes 202 and a plurality of Y electrodes 201 which form a matrix pattern. The electrodes 201, the electrodes 202, and the detection control circuit 108 use separate signal lines to transmit the detection signals 107, thereby complicating the electrode structure.

Figure 26:
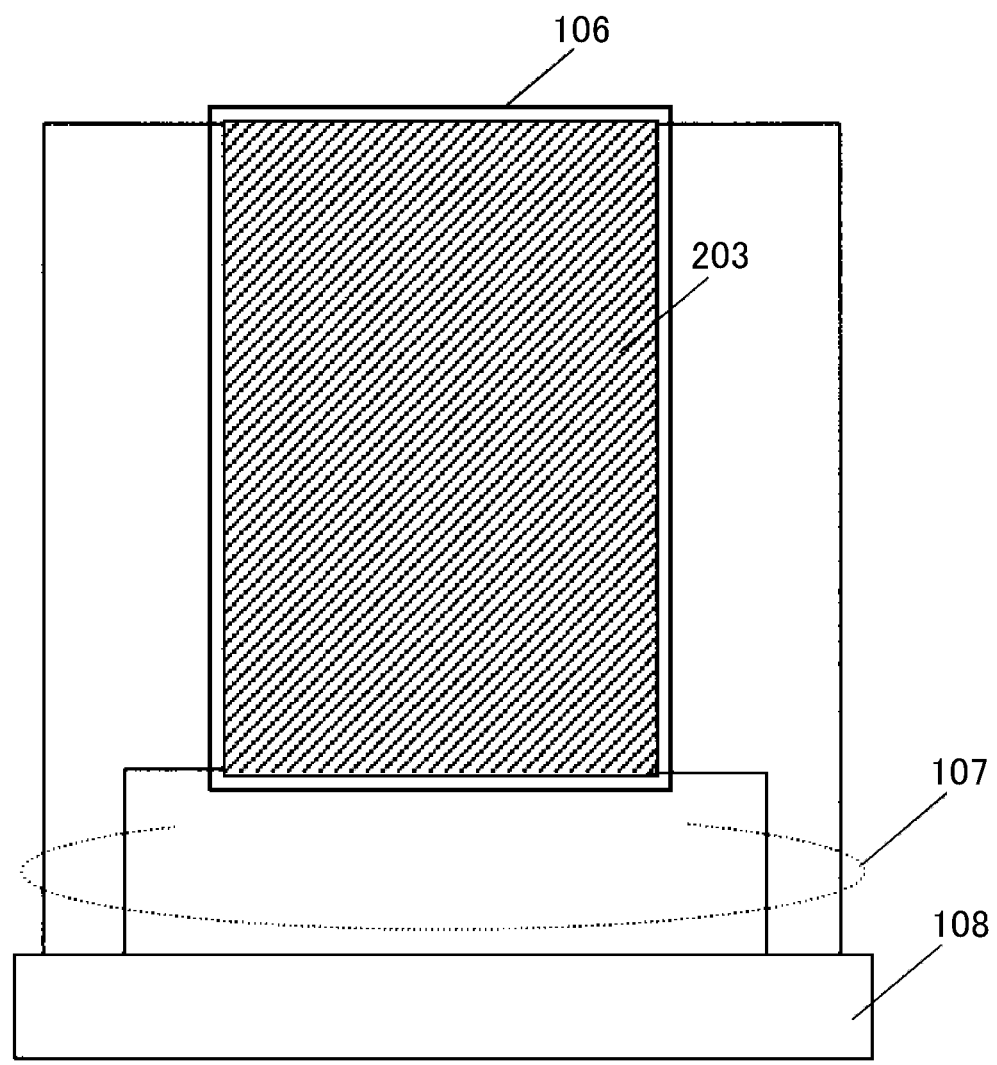
FIG. 26 is a diagram illustrating a schematic structure of a conventional surface touch sensor.
Figure 27:
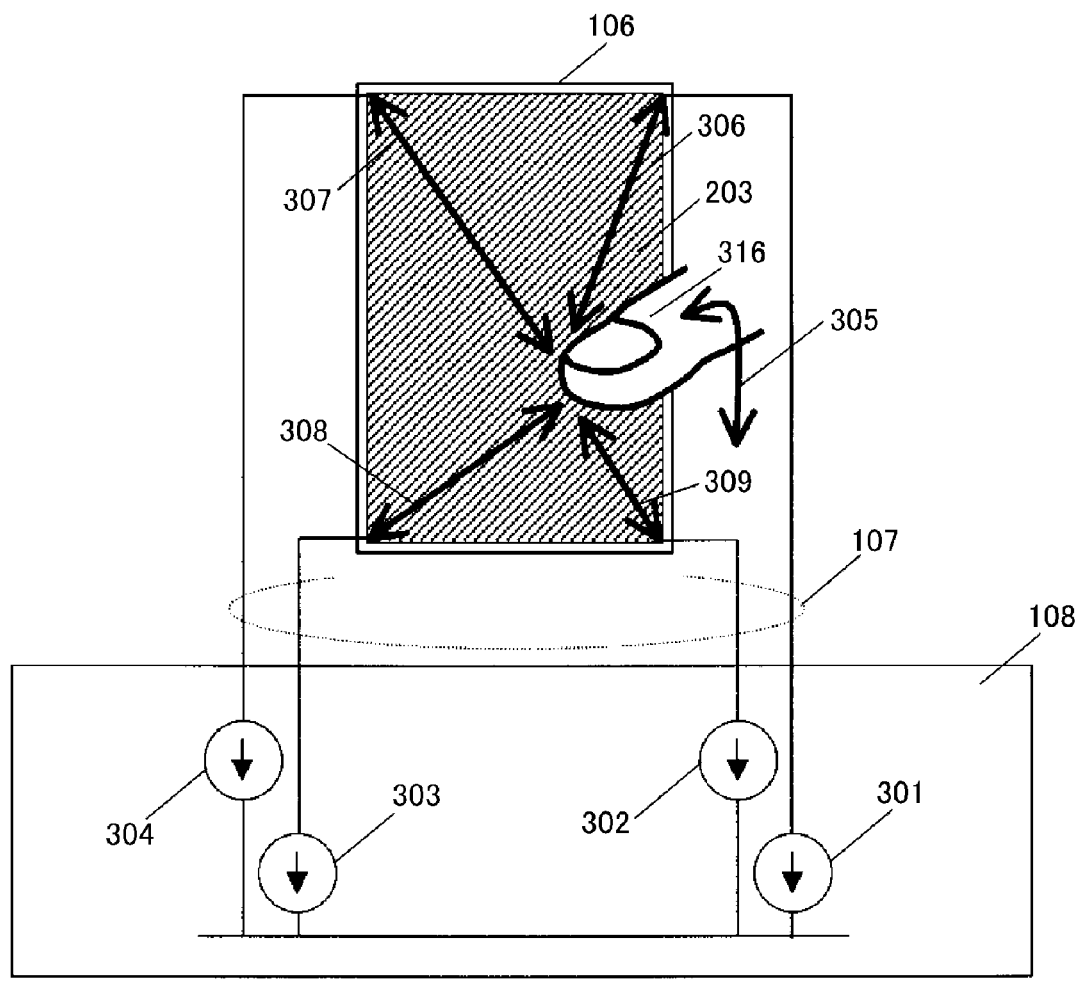
FIG. 27 is a diagram illustrating the schematic operation of the conventional surface touch sensor.

A conventional surface touch sensor illustrated in FIG. 26 takes the detection signals 107 out of the four corners of the single-piece sheet electrode 203, and the detection signals 107 taken out are input to the detection control circuit 108. In this surface touch sensor, signal sources 301 to 304 are connected to line paths of the detection signals 107 which are connected to the detection control circuit 108 as illustrated in FIG. 27. The signal sources 301 to 304 supply signals to the electrode 203. When the finger 316 is brought into contact with the electrode 203, a current 305 which is a part of currents 306 to 309 from the signal sources 301 to 304 flows to the outside of the electrode 203 through the finger 316. This changes the values of the currents 306 to 309. A change in the amount of current depends on the point of contact of the finger 316 with the electrode 203, and the point can therefore be detected by detecting the change in the amount of current.

Figure 28:
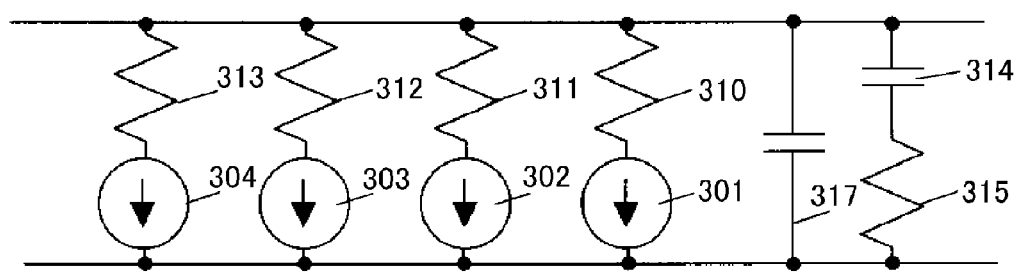
FIG. 28 is a circuit diagram using a lumped element to illustrate an equivalent circuit including components of a conventional surface touch panel.

FIG. 28 is a diagram using a lumped element to illustrate an equivalent circuit including components of a conventional surface touch panel. The principle of detection is described with reference to FIG. 28. In FIG. 28, the finger 316 is represented by a capacitor 314 and a resistor 315 which are connected in series, and the electrode 203 is represented by resistors 310 to 313 and a capacitor 317 which connect a contact point of the finger 316 and connection points of lines of the detection signals 107. A change in the amount of current from the signal sources 301 to 304 in this case changes depending on the values of the resistors 310, 311, 312, and 313, which connect a contact point of the finger 316 and connection points of lines of the detection signals 107. Therefore, in order to enhance the sensitivity to a change, the resistors 310, 311, 312, and 313 connecting a contact point of the finger 316 and connection points of lines of the detection signals 107 accordingly need to have large values, in other words, the electrode 203 is required to be large in area. In the case where the electrode 203 is small in area, on the other hand, the resistors 310, 311, 312, and 313 have small values and the sensitivity to a change is accordingly lowered. This makes it difficult to apply the surface type to a small-area sensor.

In contrast, a touch sensor of the present invention which inputs an alternating current signal from one of two opposing sides of a single-piece sheet electrode and detects the signal on the other side as described above is capable of detecting a contact point with high precision even when the single-piece sheet electrode is small in area.

[Second Embodiment]

Figure 21:
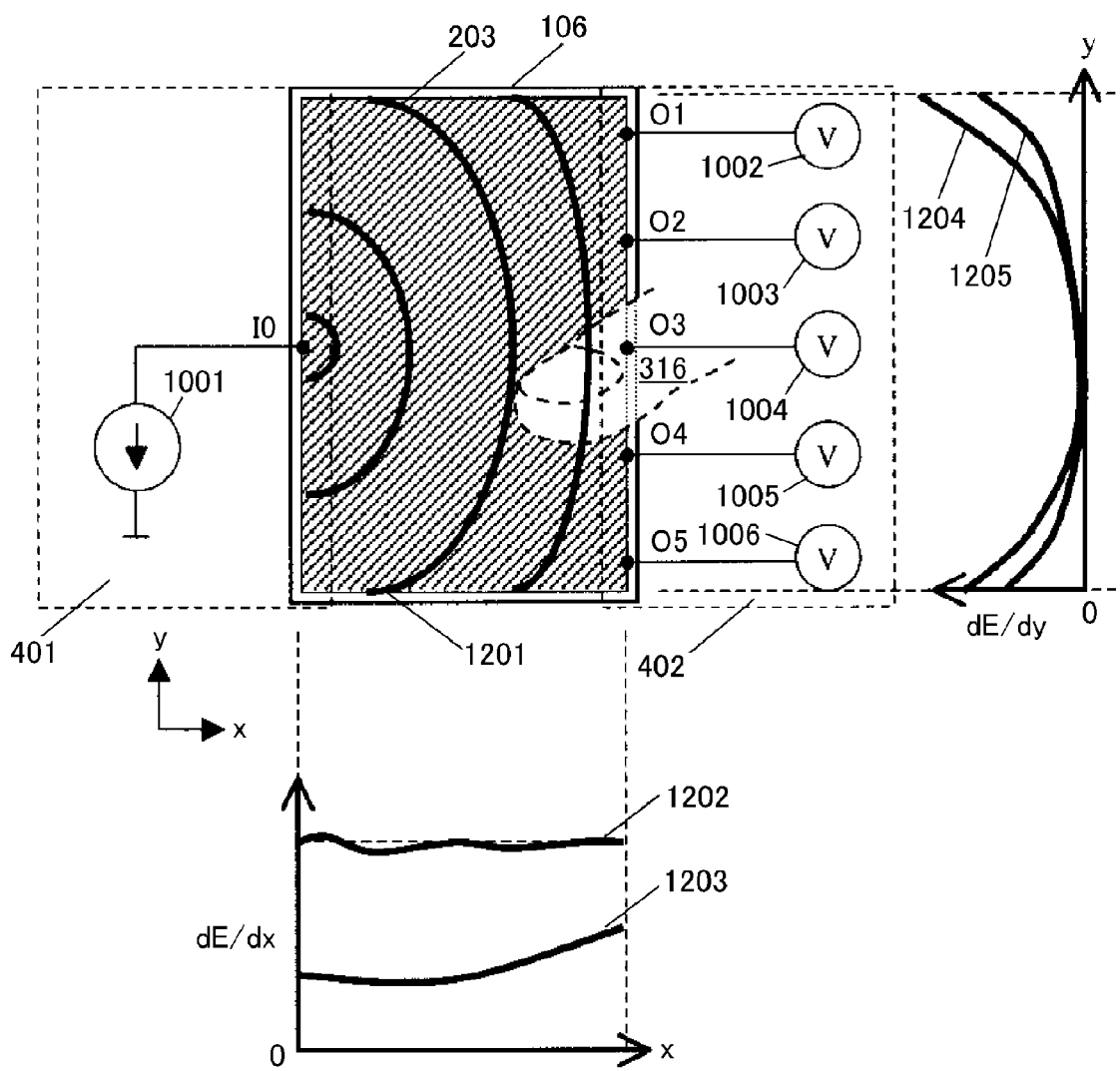
FIG. 21 is a diagram illustrating the structure of a touch sensor in a display system according to a second embodiment of the present invention.

FIG. 21 is a diagram illustrating the structure of a touch sensor in a display system according to a second embodiment of the present invention. The touch sensor of the second embodiment has the same structure as in the first embodiment, except that an alternating current signal is input to the single-piece sheet electrode 203 from one input point. The following description therefore deals mainly with details of the structure of the input point and detection operation of the touch sensor.

In the touch sensor 106 of the second embodiment, one input point I0 is provided at the middle point along one of the four sides of the single-piece sheet electrode 203 where an alternating current signal is input (left-hand side in FIG. 21), and one of the four sides of the single-piece sheet electrode 203 that is opposite to this side is provided with five detection points as illustrated in FIG. 21. With this structure, when an alternating current signal is applied to the supply point I0, the electric potential distribution in the single-piece sheet electrode 203 is changed to create an electric potential distribution that is indicated by isoelectric lines 1201. At this point, the electric field intensity in a direction from the input point I0 to the detection points O1 to O5, namely, the x-axis direction, is as indicated by an electric field intensity graph (electric field intensity characteristics) 1202, and is flat as in the first embodiment around the mid point in the y-axis direction of the single-piece sheet electrode 203 (for example, from the input point I0 to the detection point O3). Near the ends in the y-axis direction of the single-piece sheet electrode 203 (near the top end and the bottom end in FIG. 21), on the other hand, the electric field intensity is uneven as indicated by an electric field intensity graph (electric field intensity characteristics) 1203. The electric field intensity in a direction parallel to the longer sides of the single-piece sheet electrode 203 along which the input point and the detection points are aligned, namely, the y-axis direction, also differs between a portion around the middle point in the x-axis direction of the single-piece sheet electrode 203 and a portion near the ends in the x-axis direction of the single-piece sheet electrode 203 (near the detection points). The electric field intensity in the y-axis direction in the former portion is as indicated by an electric field intensity graph (electric filed intensity characteristics) 1204, and the electric field intensity in the y-axis direction in the latter portion is as indicated by an electric field intensity graph (electric filed intensity characteristics) 1205.

Figure 22:
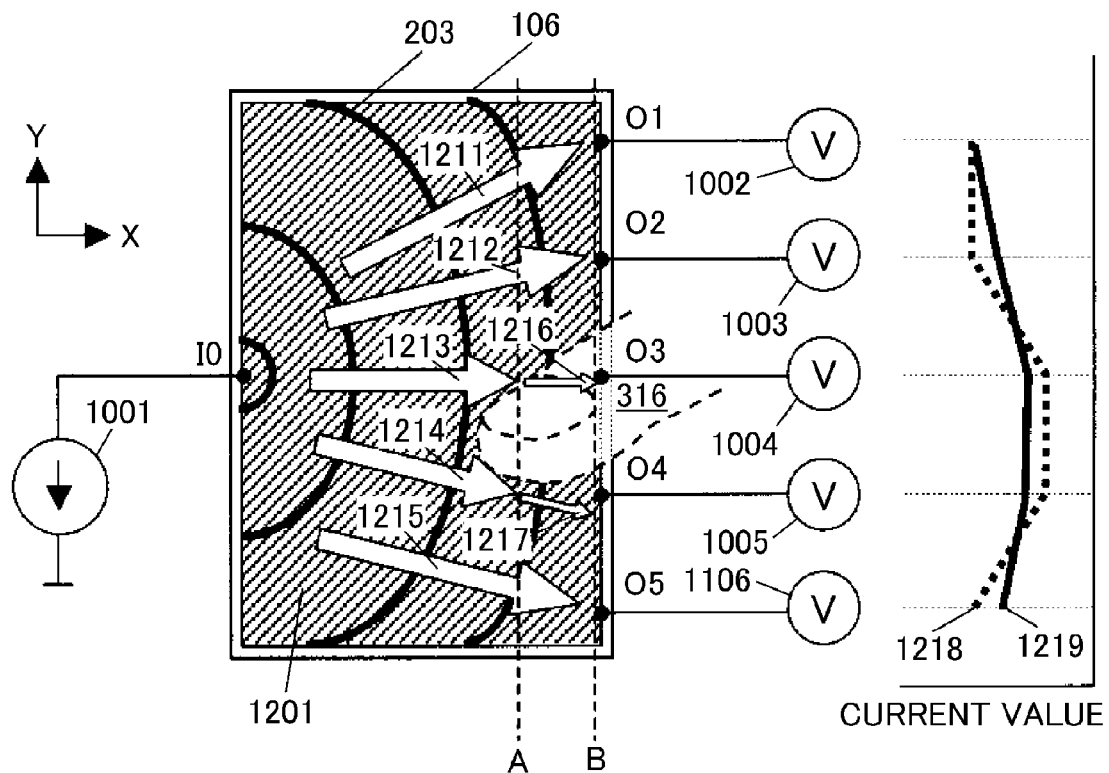
FIG. 22 is a diagram illustrating an electric potential distribution in a single-piece sheet electrode according to the second embodiment.

Once this electric potential distribution is created, as illustrated in FIG. 22, it becomes difficult for signal currents 1211 to 1215 flowing from the input point I0 to the detection points O1 to O5 to flow in parallel to the shorter sides of the single-piece sheet electrode 203 where input and detection are not performed. Therefore, when the finger 316 or the like is brought into contact with the touch sensor 106 along the dotted line A, the signal currents 1213 and 1214 are turned into signal currents 1216 and 1217 through attenuation, thereby changing the current distribution, but this distribution is hardly maintained due to the influence of the electric potential distribution described above. As a result, the distribution is undesirably averaged near the detection points as indicated by a current distribution graph 1218 along the dotted line A and a current distribution graph 1219 along the dotted line B. This makes the contact point detection accuracy in the touch sensor of the second embodiment lower than in the touch sensor of the first embodiment. However, as is obvious from the current distribution graph 1219, the touch sensor of the second embodiment is still capable of detecting the contact point of the finger 316. The second embodiment is therefore suitable for a touch sensor that is used in combination with a small-sized display panel or a low resolution display panel when, for example, the display panel displays only a few options such as "yes" and "no" and the position of the finger 316 which corresponds to an option chosen by the operator is identified. Fixing one of the four sides of the single-piece sheet electrode 203 along which the input point is disposed and one of the four sides of the single-piece sheet electrode 203 along which the detection points are disposed reduces the number of signal lines that connect the input point and detection points of the touch sensor to the detection control circuit 108. This provides special effects in that the frame portion of the display system is narrowed and that the manufacture cost of the display system is lowered.

[Third Embodiment]

Figure 23:
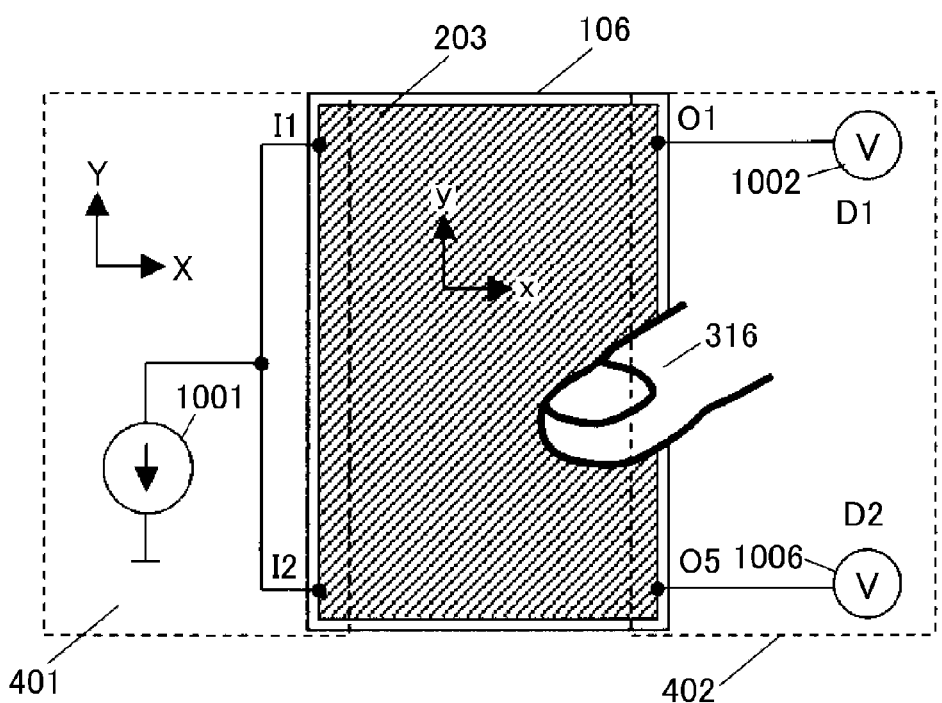
FIG. 23 is a diagram illustrating the structure of a touch sensor in a display system according to a third embodiment of the present invention.
Figure 24:
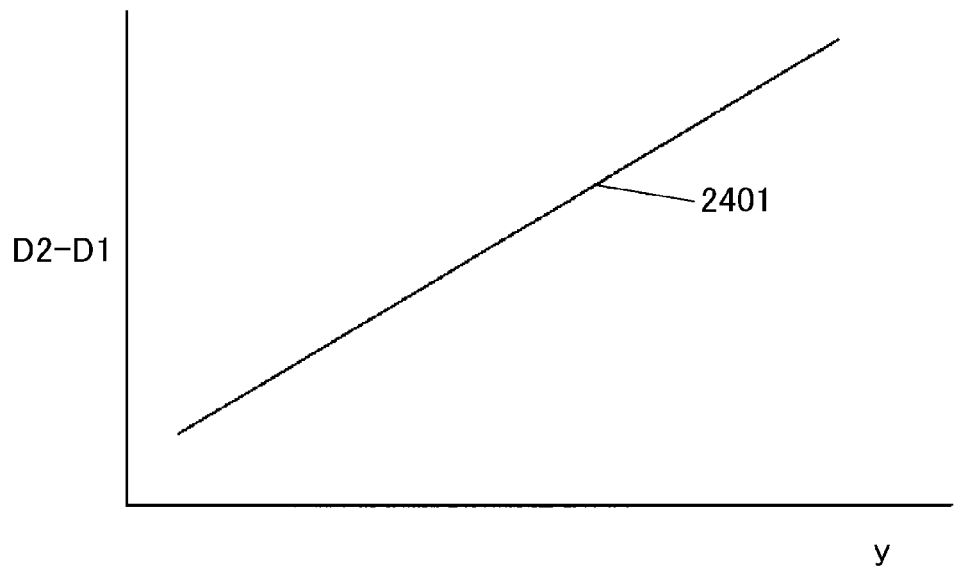
FIG. 24 is a graph illustrating the state of an output signal in the display system according to the third embodiment of the present invention.

FIG. 23 is a diagram illustrating the structure of a touch sensor in a display system according to a third embodiment of the present invention. FIG. 24 is a graph illustrating the state of an output signal in the display system according to the third embodiment of the present invention. The touch sensor of the third embodiment has the same structure as in the first embodiment, except that two input points and two detection points are provided in the four corners of the touch sensor, and except detection operation for detecting the point of contact with a finger from the two detection points. The following description therefore deals mainly with details of the structure of the input points and the detection points and the detection operation.

As illustrated in FIG. 23, the touch sensor of the third embodiment has electrodes that serve as input points and output points in the four corners of the single-piece sheet electrode 203. In the touch sensor of the third embodiment, two adjacent points, specifically, two points that are disposed at the ends of one of the four sides of the single-piece sheet electrode 203 are chosen to serve as the input points I1 and I2, and the remaining two points function as the output points O1 and O5. In this manner, an alternating current signal is input from one of two opposing perimeter portions and is detected in the other perimeter portion, which is opposite to the perimeter portion for inputting the alternating current signal. This detection of an alternating current signal is made by the voltmeter 1002, which is connected to the output point O1, and the voltmeter 1006, which is connected to the output point O5, as in the first embodiment.

The touch sensor of the third embodiment measures the voltage only at the two detection points O1 and O5. Therefore, when a measurement value obtained by the voltmeter 1002 is given as D1 and a measurement value obtained by the voltmeter 1006 is given as D2, for example, a line 2401 illustrated in FIG. 24 is obtained by subtracting the measurement value D1 from the measurement value D2. The position of the finger 316 of the operator can accordingly be calculated in the third embodiment from, for example, the gradient of the line 2401 and the input alternating current signal by a known method. This operation is repeated for each of the four sides of the single-piece sheet electrode 203, to thereby obtain, in addition to the effects of the first embodiment described above, a special effect in that the number of signal lines for connecting the touch sensor and the switch circuit 802, namely, the number of signal lines that are connected to the single-piece sheet electrode 203, is reduced significantly. As a result, the frame portion of the touch sensor of the third embodiment can be narrowed even more. Furthermore, the switch circuit, the signal source circuit, and the signal detection circuit can be reduced in circuit scale, which provides a special effect in that the manufacture cost is further lowered.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An input apparatus comprising:
    a touch sensor including a transparent substrate with which an object is brought into contact, and a rectangular single sheet electrode formed on the transparent substrate from a transparent conductive film, to detect a contact point of the contacting object;
    first detection means which inputs a measurement signal to the rectangular single sheet electrode from one of two opposing perimeter portions along a first direction, and takes out the measurement signal propagated through the rectangular single sheet electrode from another one of the two opposing perimeter portions, to detect the contact point along the first direction; and
    second detection means which, after the contact point in the first direction is detected, inputs a measurement signal to the rectangular single sheet electrode from one of two opposing perimeter portions along a second direction intersecting the first direction, and takes out the measurement signal propagated through the rectangular single sheet electrode from another one of the two opposing perimeter portions, to detect the contact point along the second direction,
    wherein the measurement signal comprises an alternating current signal containing a frequency band in which contact between the rectangular single sheet electrode and the contacting object changes the alternating current signal, and
    wherein the input apparatus further comprises a correction circuit configured to correct the alternating current signal so as to contain a frequency at a peak value of a differential frequency characteristic, which is a difference between frequency characteristics of the rectangular single sheet electrode observed when the object is not in contact with the touch sensor and the frequency characteristics of the rectangular single sheet electrode observed when the object is in contact with the touch sensor, at a maximum value.

2. The input apparatus according to claim 1,
    wherein the rectangular single sheet electrode comprises electrodes in perimeter portions opposed to each other along the first direction and the second direction,
    wherein the first detection means and the second detection means have switching means, which switches the perimeter portion for inputting the measurement signal and the perimeter portion for detecting the measurement signal via the electrodes, and
    wherein the switching means sequentially switches the perimeter portion for inputting the measurement signal and the perimeter portion for detecting the measurement signal, to detect the contact point of the contacting object.

3. The input apparatus according to claim 1,
wherein the rectangular single sheet electrode comprises at least two detection points from which propagated measurement signals are taken out, and
wherein the first detection means and the second detection means each calculate the contact point of the contacting object based on the measurement signal input from the one of the two opposing perimeter portions, and a detection value measured at each of the at least two detection points.

4. The input apparatus according to claim 3, further comprising four electrodes which are each formed in one of four corners of the rectangular single sheet electrode,
wherein the first detection means and the second detection means each input the measurement signal from two of the four electrodes that are formed at both ends of the perimeter portion for inputting the measurement signal, and uses other two of the four electrodes to measure the measurement signal propagated through the rectangular single sheet electrode.

5. The input apparatus according to claim 1, wherein, when one of the first detection means and the second detection means is measuring, another one of the first detection means and the second detection means does not fix electric potential of the perimeter portion at which signal input and signal detection are not performed.

6. The input apparatus according to claim 1, wherein an input point of the measurement signal and a detection point of the measurement signal are formed in a manner that makes a gradient of an electric field intensity in the rectangular single sheet electrode in a direction from the perimeter portion for inputting the measurement signal to the perimeter portion for detecting the measurement signal to be substantially flat.

7. The input apparatus according to claim 1, further comprising correction means which corrects influence of a resistance component of a line path running from the first detection means and the second detection means to the rectangular single sheet electrode over detection sensitivity, based on signal transmission characteristics of a system formed of the rectangular single sheet electrode and the contacting object.

8. A display system comprising:
a display panel including a display unit;
a transparent substrate which is disposed on a display side of the display panel and with which an object comes into contact;
a rectangular single sheet electrode which is formed on the transparent substrate from a transparent conductive film;
first detection means which inputs a measurement signal to the rectangular single sheet electrode from one of two opposing perimeter portions along a first direction, and takes out the measurement signal propagated through the rectangular single sheet electrode from another one of the two opposing perimeter portions, to detect a contact point of the contacting object along the first direction; and
second detection means which, after the contact point in the first direction is detected, inputs a measurement signal to the rectangular single sheet electrode from one of two opposing perimeter portions along a second direction intersecting the first direction, and takes out the measurement signal propagated through the rectangular single sheet electrode from another one of the two opposing perimeter portions, to detect the contact point along the second direction,
wherein the measurement signal comprises an alternating current signal containing a frequency band in which contact between the rectangular single sheet electrode and the contacting object changes the alternating current signal, and
wherein the display system further comprises a correction circuit configured to correct the alternating current signal so as to contain a frequency at a peak value of a differential frequency characteristic, which is a difference between frequency characteristics of the rectangular single sheet electrode observed when the object is not in contact with the touch sensor and the frequency characteristics of the rectangular single sheet electrode observed when the object is in contact with the touch sensor, at a maximum value.

9. The display system according to claim 8,
wherein the rectangular single sheet electrode comprises electrodes in perimeter portions opposed to each other along the first direction and the second direction,
wherein the first detection means and the second detection means have switching means, which switches the perimeter portion for inputting the measurement signal and the perimeter portion for detecting the measurement signal via the electrodes, and
wherein the switching means sequentially switches the perimeter portion for inputting the measurement signal and the perimeter portion for detecting the measurement signal, to detect the contact point of the contacting object.

10. The display system according to claim 8,
wherein the rectangular single sheet electrode comprises at least two detection points from which propagated measurement signals are taken out, and
wherein the first detection means and the second detection means each calculate the contact point of the contacting object based on the measurement signal input from the one of the two opposing perimeter portions, and a detection value measured at each of the at least two detection points.

11. The display system according to claim 10, further comprising four electrodes which are each formed in one of four corners of the rectangular single sheet electrode,
wherein the first detection means and the second detection means each input the measurement signal from two of the four electrodes that are formed at both ends of the perimeter portion for inputting the measurement signal, and uses other two of the four electrodes to measure the measurement signal propagated through the rectangular single sheet electrode.

12. The display system according to claim 8, wherein, when one of the first detection means and the second detection means is measuring, another one of the first detection means and the second detection means does not fix electric potential of the perimeter portion at which signal input and signal detection are not performed.

13. The display system according to claim 8, wherein an input point of the measurement signal and a detection point of the measurement signal are formed in a manner that makes a gradient of an electric field intensity in the rectangular single sheet electrode in a direction from the perimeter portion for inputting the measurement signal to the perimeter portion for detecting the measurement signal to be substantially flat.

14. The display system according to claim 8, further comprising correction means which corrects influence of a resistance component of a line path running from the first detection means and the second detection means to the rectangular single sheet electrode over detection sensitivity, based on signal transmission characteristics of a system formed of the rectangular single sheet electrode and the contacting object.

* * * * *